US012151340B1

(12) United States Patent
Emmert

(10) Patent No.: US 12,151,340 B1
(45) Date of Patent: Nov. 26, 2024

(54) PORTABLE UTILITY VISE DEVICE

(71) Applicant: Philip H. Emmert, Sterling Heights, MI (US)

(72) Inventor: Philip H. Emmert, Sterling Heights, MI (US)

(*) Notice: Subject to any disclaimer, the term of this patent is extended or adjusted under 35 U.S.C. 154(b) by 0 days.

(21) Appl. No.: 18/655,364

(22) Filed: May 6, 2024

(51) Int. Cl.

| | |
|---|---|
| ***B25H 1/04*** | (2006.01) |
| ***B25B 1/02*** | (2006.01) |
| ***B25B 1/12*** | (2006.01) |
| ***B25B 1/22*** | (2006.01) |
| ***B25B 5/10*** | (2006.01) |
| *B25B 1/10* | (2006.01) |
| *B25B 1/20* | (2006.01) |
| *B25B 5/16* | (2006.01) |

(52) U.S. Cl.
CPC .................. *B25B 1/02* (2013.01); *B25B 1/12* (2013.01); *B25B 1/22* (2013.01); *B25B 5/102* (2013.01); *B25H 1/04* (2013.01); *B25B 1/103* (2013.01); *B25B 1/20* (2013.01); *B25B 5/163* (2013.01); *Y10S 269/901* (2013.01)

(58) Field of Classification Search
CPC ........... B25H 1/04; B25B 5/102; B25B 1/103; B25B 1/02; B25B 1/12; B25B 1/22; B25B 1/20; B25B 5/163; Y10S 269/901
USPC ........................... 269/139, 244, 147, 901, 86
See application file for complete search history.

(56) References Cited

U.S. PATENT DOCUMENTS

| | | | | |
|---|---|---|---|---|
| 1,497,862 A * | 6/1924 | Lund | B25B 5/003 | 269/208 |
| 4,231,557 A * | 11/1980 | Blachly | B25H 1/16 | 269/244 |
| 4,291,869 A * | 9/1981 | Hickman | B25H 1/14 | D25/67 |
| 4,294,441 A * | 10/1981 | O'Banion | B25H 1/18 | 269/95 |
| 4,478,397 A * | 10/1984 | Krueger | B25B 1/14 | 269/221 |
| 4,498,662 A * | 2/1985 | Halter | B25H 1/10 | 269/283 |
| 5,338,016 A * | 8/1994 | Howard | B25B 1/103 | 269/208 |
| 6,039,313 A * | 3/2000 | Baculy | B25B 5/068 | 269/282 |
| 6,050,559 A * | 4/2000 | de Souza | B25B 1/10 | 269/208 |
| 6,930,272 B1 * | 8/2005 | Limano | B23H 11/003 | 269/240 |

(Continued)

*Primary Examiner* — Mahdi H Nejad

(57) ABSTRACT

A portable utility vise device is provided utilizing a clamping assembly having a front elongate frame member, a rear elongate frame member, a left elongate frame member and a right elongate frame member. The left and right elongate frame members may each utilize a clamp bar coupled to an outer side surface thereof. Each clamp bar may have a rear clamp jaw disposed at a distal terminal end thereof. The front elongate frame member may utilize a clamp screw assembly. The portable utility vise device may further utilize a vise assembly coupled to the clamping assembly and having a left vise carriage and a right vise carriage. The left and right vise carriages may each have an elongate channel and a translation screw disposed therein. The left and right vise carriages may each have at least one coupling receptacle structure partially disposed within their respective elongate channels.

20 Claims, 18 Drawing Sheets

(56) References Cited

U.S. PATENT DOCUMENTS

| | | | | |
|---|---|---|---|---|
| 11,541,511 | B2 * | 1/2023 | Wolf | B25B 5/166 |
| 2003/0214088 | A1 * | 11/2003 | Chang | B25H 1/18 269/139 |
| 2020/0290194 | A1 * | 9/2020 | Emmert | B25H 1/14 |
| 2022/0072684 | A1 * | 3/2022 | Morris | B25B 1/103 |

* cited by examiner

PORTABLE UTILITY VISE DEVICE

BACKGROUND OF THE INVENTION

The utility vise industry, a cornerstone in mechanical and metalworking fields, has seen continuous evolution to accommodate varying user needs. Traditional bench vises, often made of iron, provide a stable work surface with replaceable metal jaws, and are suitable for heavy-duty industrial operations. They often feature a swivel base for rotational movement and can double as an anvil in some designs. Despite their utility, these vises require a stable working surface, making them less adaptable for mobile or varied work environments.

A significant gap in the current market is the lack of versatile, portable vises that can easily adapt to different work conditions. Heavy-duty bench vises, typically made from iron, are designed for rigorous industrial operations. However, their heavy construction and requirement for a stable mounting surface hinder their portability. While some models offer a 360-degree swivel for versatile use, their overall design is not conducive to easy transportation, limiting their usability in dynamic work environments.

Medium-duty bench vises, though slightly more versatile than heavy-duty models, still face limitations. While they are well-suited for a variety of applications and often come with a built-in anvil and replaceable jaws, they are not designed for mobility. These vises, like their heavy-duty counterparts, require a stable mounting surface, making them impractical for tasks requiring mobility or for use in varying locations.

Pipe vises and chain vises, specialized for plumbing and handling irregularly shaped objects respectively, demonstrate the industry's focus on specialized tools. Pipe vises, used for securing pipes during cutting or threading, offer some portability when fitted onto mobile tripod stands. However, their design is highly specific to plumbing tasks, limiting their versatility. Chain vises, while offering a larger working range due to their adjustable chain, are more time-consuming to set up and are also tailored for specific applications rather than general use.

Yoke vises, known for their adjustable jaw vise, are effective for securing pipes but suffer from similar limitations. Their design is not conducive to quick setup and breakdown, which is critical for portability. Additionally, like other specialized vises, they are focused on a specific set of tasks, which restricts their broader application.

In summary, while the current market offers a range of vises for specific tasks, there is a notable absence of a product that combines the robustness and versatility of heavy-duty vises with the portability and adaptability required in varied work environments. This gap presents a significant opportunity for a new type of vise, such as a portable utility vise device, that addresses these specific market needs.

Another notable issue in existing vise devices is their lack of user-friendliness, a factor that significantly impacts efficiency and user experience. Many traditional vises have complex setup procedures and require considerable effort and time for installation and adjustments. For instance, heavy-duty bench vises often necessitate a stable and permanent mounting surface, which is not always feasible in varied work environments. The adjustability of these vises is also limited, making it difficult to accommodate a wide range of workpiece sizes and shapes efficiently. Additionally, the operation of specialized vises like pipe or chain vises can be cumbersome and non-intuitive, particularly for less experienced users.

The adjustability constraints of current vise designs pose significant limitations, particularly when dealing with diverse workpiece sizes and shapes. For example, bench vises, while robust, typically have a fixed jaw opening range, limiting their adaptability to different sizes of materials. Adjusting these vises to securely hold various shapes can be inefficient and time-consuming, often requiring additional tools or accessories. This rigidity in size accommodation restricts their utility in scenarios where quick adaptation to different workpieces is essential.

Furthermore, the user experience with specialized vises, such as pipe and chain vises, is often less than ideal, particularly for novice users. Pipe vises, designed for holding cylindrical objects, require precise alignment and adjustments, which can be a complex and unintuitive process for those unfamiliar with their mechanism. Similarly, chain vises, which use a high-tensile steel chain to secure objects, demand careful threading of the chain through the jaws for effective clamping. This process can be cumbersome and time-consuming, especially when dealing with irregularly shaped or large objects. The lack of quick-release mechanisms in these designs further exacerbates the issue, leading to increased effort and time spent in securing and releasing workpieces.

The operational difficulties with these vises are not limited to their mechanical adjustments. Many of these vises lack ergonomic considerations, leading to physical strain during operation. The force required to operate the screws or levers, especially in heavy-duty vises, can be substantial, potentially leading to user fatigue or injury over prolonged use. The absence of features that facilitate ease of use, such as comfortable grips or easily accessible adjustment controls, is a significant oversight in the design of these tools.

The physical exertion required to secure and release workpieces, coupled with the limited ergonomic design of these vises, further adds to the challenge. These factors collectively highlight a significant gap in the market for a user-friendly, versatile, and easily adjustable vise device that can cater to diverse user needs with minimal setup time and effort.

Therefore, it would be advantageous to provide a portable utility vise device that seeks to address these market gaps by offering a solution that is both versatile and easily transportable. It aims to provide a robust functionality that can cater to a wide range of workpiece sizes and shapes, while being compact and lightweight enough for easy transportation, thus bridging the gap between stationary heavy-duty vises and the need for a flexible, multi-environment tool.

DETAILED DESCRIPTION OF THE INVENTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms “a,” “an,” and “the” include plural referents unless the context clearly dictates otherwise. Thus, for example, reference to “a portable utility vise device” or any of its constituent parts also includes a plurality of portable utility vise devices or any of its constituent parts and the like.

Figure 1A:
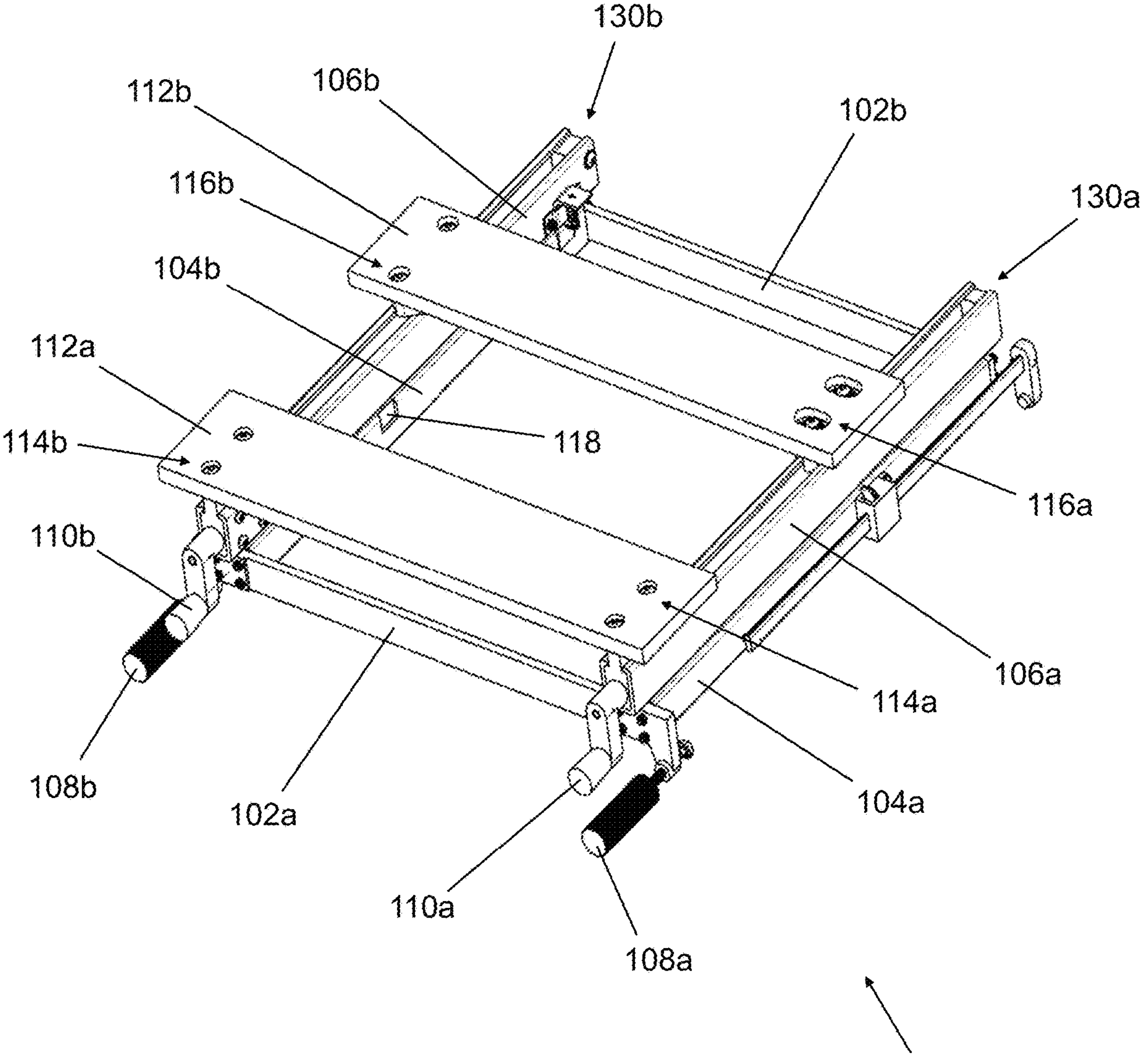
FIG. 1A illustrates a top perspective view of a portable utility vise device in accordance with some embodiments of the present invention.

Exemplary embodiments of the present invention are illustrated in the accompanying figures. As shown in FIG. 1A, a top perspective view of a portable utility vise device 100*a* is provided. The portable utility vise device 100*a* may comprise front and rear elongate frame members 102*a*, 102*b* that couple to left and right elongate frame members 104*a*, 104*b* which collectively act to provide a base of stabilization for the vise device 100*a* during operation. Left and right clamp screw assemblies 108*a*, 108*b* may be coupled to terminal ends of the front elongate frame member 102*a*. The clamp screw assemblies 108*a*, 108*b* may each comprise a front clamp jaw and may be used to secure the vise device 100*a* to a base structure in order to provide a leveling and stabilizing feature prior to use of the vise device 100*a*.

Left and right vise carriages 106*a*, 106*b* may be respectively coupled above the left and right elongate frame members 104*a*, 104*b*. The left and right vise carriages 106*a*, 106*b* are designed to be generally right-side-up U-shaped with an elongate cavity therein through which translation screws may be disposed and an opening at the top of each channel 106*a*, 106*b* for coupling of the first and second vise jaws 112*a*, 112*b* therethrough. The translation screws may be actuated via respective left and right vise cranks 110*a*, 110*b* which in turn translates the first or second vise jaw 112*a*, 112*b* accordingly. The translation screws may terminate at a distal end at respective left and right bearing structures 130*a*, 130*b* which are the structures that secure the translation screws to their respective vise carriages 106*a*, 106*b*.

The portable utility vise device features distinct mechanisms for stabilization and adjustment, embodied in the clamp screw assemblies 108*a*, 108*b* and vise cranks 110*a*, 110*b* respectively. The clamp screw assemblies 108*a*, 108*b* may be fixed about an axis running axially through each assembly and are operable in a knob-like fashion, allowing for both clockwise and counterclockwise rotation about the axis for secure attachment to a base structure. This knob-like operation provides a straightforward, intuitive means for the user to level and stabilize the vise device 100*a* before operation, minimizing setup time and effort. In contrast, the vise cranks 110*a*, 110*b* are designed to rotate around the axial axis in the manner of a crank. This arrangement is not only more ergonomic, allowing the user to exert greater leverage with less effort when turning the translation screws, but it also ensures that the cranks do not interfere with the operation of the clamp screw assemblies.

Such a design of the clamp screw assemblies 108*a*, 108*b* and vise cranks 110*a*, 110*b* would be advantageous to provide given that the separation of these functions into two distinct structural mechanisms enhances the usability of the vise device 100*a*, allowing for quick and efficient adjustments of the vise jaws 112*a*, 112*b* while maintaining the position of the vise device 100*a* and stability during use. This structural design reflects an emphasis on user efficiency, ergonomic operation, and a clear delineation between stabilizing and adjusting actions in the operation of the portable utility vise device 100*a*.

The vise carriages 106*a*, 106*b* providing the U-shaped design would be advantageous in that it enables easy access for maintenance and cleaning. The open-top design of the carriages 106*a*, 106*b* allows debris to be removed quickly, preventing build-up that could otherwise impair the vise's function. This structural consideration is essential for maintaining the portable utility vise device's 100*a* reliability, especially in environments where particulates and debris are common.

The first and second vise jaws 112*a*, 112*b* may be coupled to the vise carriages 106*a*, 106*b* via sets of coupling screws. Specifically, the left and right terminal ends of the first vise jaw 112*a* may be secured to the vise carriages 106*a*, 106*b* via first and second sets of fixed couplings 114*a*, 114*b*. The left and right terminal ends of the second vise jaw 112*b* may be secured to the vise channels 106*a*, 106*b* via first and second sets of rotational couplings 116*a*, 116*b*.

The first and second sets of fixed couplings 114*a*, 114*b* and the second set of rotational couplings 116*b* may have a substantially similar or identical shape relative one another. In the embodiment of FIG. 1A, the first and second sets of fixed couplings 114*a*, 114*b* and the second set of rotational couplings 116*b* are shown to have a circular or cylindrical shape or the like. The first set of rotational couplings 116*a*, however, may have an ovular or ellipsoidal shape or the like. The second set of rotational couplings 116*b* are still considered rotational even though they may have the same shape as the first and second sets of fixed couplings 114*a*, 114*b* and do not rotated relative their respective fasteners because the second set of rotational couplings 116*b* is allowed to rotate via relative rotation between a hub and spindle mechanism described and illustrated with respect to FIGS. 5 and 8C-8D.

It is advantageous that the first and second sets of fixed couplings 114*a*, 114*b* and the second set of rotational couplings 116*b* may have a substantially similar or identical shape relative one another, such as a circular or cylindrical shape, as it reduces design complexity and fabrication costs of the portable utility vise device 100*a* while still achieving the intended functionality. Further, it would be advantageous to provide the first set of rotational couplings 116*a* as having a distinct ovular or ellipsoidal shape in order to allow the second vise jaw 112*b* to rotate relative the first vise jaw 112*a* to a degree that allows a greater range of irregularly-shaped workpieces to be secured therebetween without having to provide customized vise jaws or without damaging the irregularly-shaped workpiece.

Additionally, the left elongate frame member 104*b* may comprise a plurality of coupling slots 118 arranged in series along the length of the member 104*b* which allows for the translational adjustment of the left and right vise carriages 106*a*, 106*b* back and forth along the left and right elongate frame members 104*a*, 104*b*. This translational adjustment functionality of the left and right vise carriages 106*a*, 106*b* is advantageous in that it allows a user to work upon a workpiece in an area disposed in front of a base structure to which the vise device 100*a* is secured. This provides enhanced user-friendliness and ease of use while allowing a user to secure elongate workpieces between the vise jaws 112*a*, 112*b* within impinging upon the base structure.

Moreover, the portable utility vise device 100*a* is advantageous in providing the coupling slots 118 along the elongate frame member 104*b*. This feature allows for rapid reconfiguration of the vise's 100*a* spatial arrangement, enabling users to adjust the device's footprint to suit the task at hand. Such configurability is advantageous for workspaces or workpieces that demand a high degree of flexibility or for tasks that require the vise 100*a* to be moved frequently.

Figure 1B:
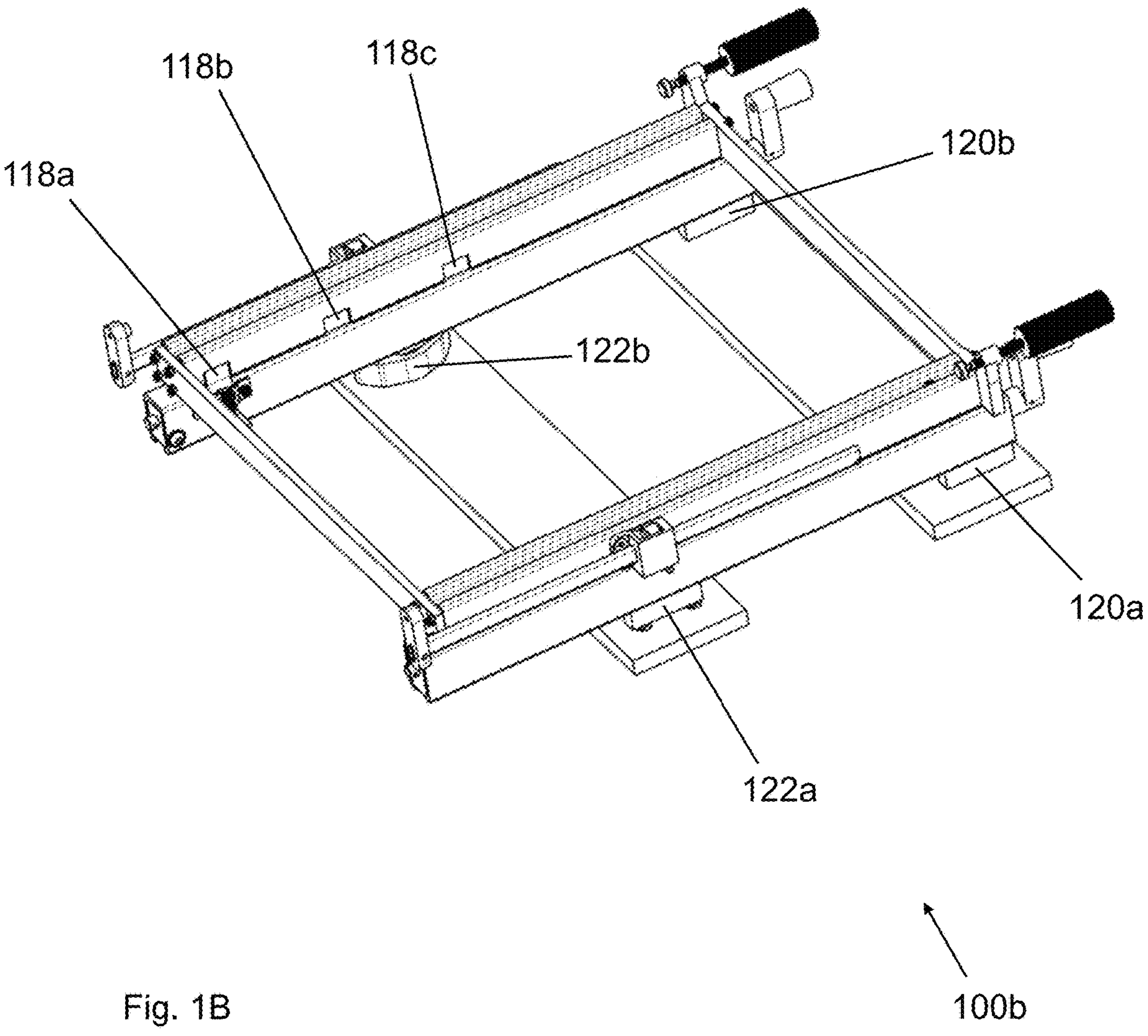
FIG. 1B illustrates a bottom perspective view of a portable utility vise device in accordance with some embodiments of the present invention.

As shown in FIG. 1B, a bottom perspective view of a portable utility vise device 100*b* is provided. The portable utility vise device 100*b* of FIG. 1B is at least similar to that of the portable utility vise device 100*a* of FIG. 1A except that the vise device 100*b* of FIG. 1B illustrates a bottom portion thereof. Specifically, the portable utility vise device 100*b* may comprise a plurality of coupling slots 118*a*-118*c* arranged in series along the length of the left elongate frame member 104*b*. FIG. 1B illustrates a bolt latch being inserted into the distal coupling slot 118*a* which places the vise device 100*b* into a stowed configuration. When the bolt latch is inserted into the middle coupling slot 118*b* then the vise device 100*b* is placed into a partially extended configuration. When the bolt latch is inserted into the proximal coupling slot 118*c* then the vise device 100*b* is placed into a fully extended configuration.

This bottom perspective view illustrates a set of fixed coupling receptacle structures 120*a*, 120*b* and a set of rotational coupling receptacle structures 122*a*, 122*b*. The set of fixed coupling receptacle structures 120*a*, 120*b* secures the first vise jaw 112*a* to the vise carriages 106*a*, 106*b* in a fixed manner that does not allow the first vise jaw 112*a* to rotate relative the receptacle structures 120*a*, 120*b* or the vise carriages 106*a*, 106*b*. The set of rotational coupling receptacle structures 122*a*, 122*b* secures the second vise jaw 112*b* to the vise carriages 106*a*, 106*b* in a rotational manner that allows the second vise jaw 112*b* to rotate relative the receptacle structures 122*a*, 122*b* and the vise carriages 106*a*, 106*b*.

The fixed and rotational coupling receptacle structures 120*a*, 120*b*, 122*a*, 122*b*, are advantageous in offering a robust mounting solution for the vise jaws. Specifically, the fixed coupling receptacles 120*a*, 120*b* ensure that the first vise jaw 112*a* remains stable and aligned during intensive operations, while the rotational receptacles 122*a*, 122*b* provide the second vise jaw 112*b* with the necessary freedom of movement. This symbiosis between stability and mobility is key to the device's functionality, allowing it to maintain a firm grip while adapting to an irregularly-shaped workpiece's form.

Figure 1C:
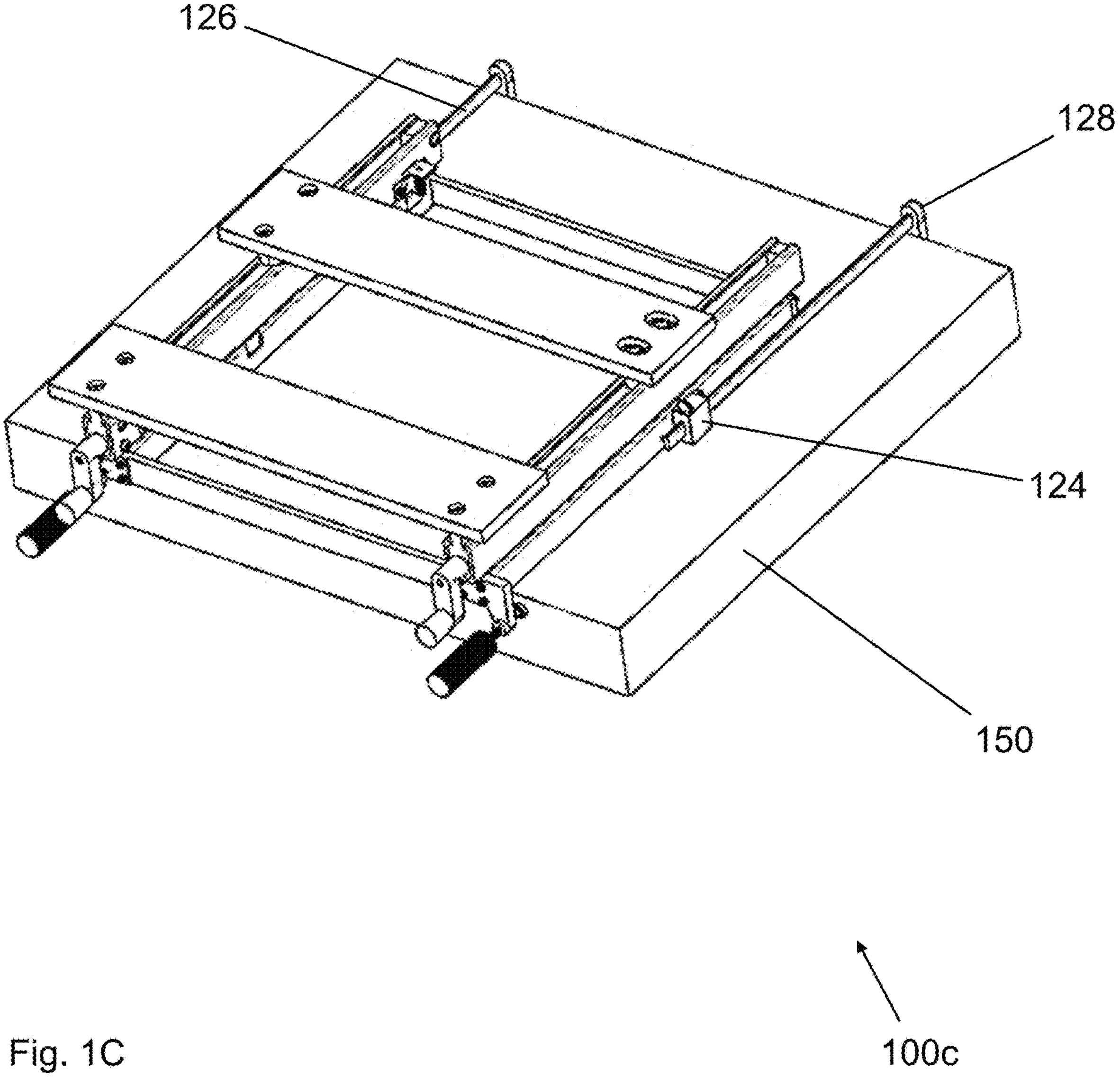
FIG. 1C illustrates a top perspective view of a portable utility vise device secured to a base structure in accordance with some embodiments of the present invention.

As shown in FIG. 1C, a top perspective view of a portable utility vise device 100*c* secured to a base structure 150 is provided. The portable utility vise device 100*c* of FIG. 1C is at least similar to that of the portable utility vise device 100*a* of FIG. 1A except that the vise device 100*c* of FIG. 1C illustrates it coupled to the base structure 150. Specifically, a user may secure the vise device 100*c* to the base structure 150 using the clamp screw assemblies 108*a*, 108*b*, clamp brakes 124, clamp bars 126, and rear clamp jaws 128. The clamp brakes 124, which may be coupled to outer portions of the frame members 104*a*, 104*b*, may be utilized to selectively prevent movement of the clamp bars 126 therethrough which then locks the rear clamp jaws 128 in place around the base structure 150 which then securely abuts the clamp screw assemblies 108*a*, 108*b* as shown in FIG. 1C.

Figure 2:
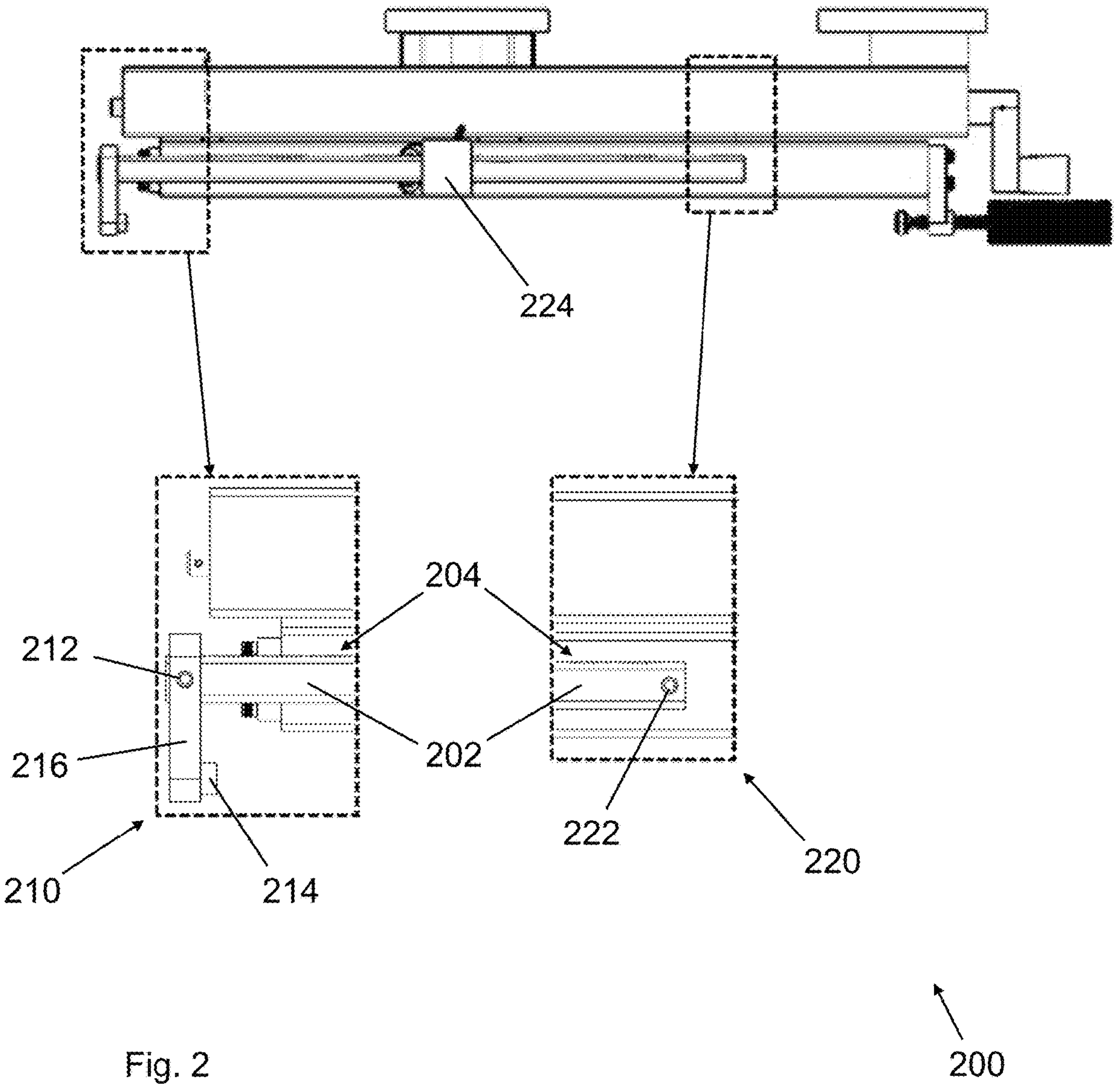
FIG. 2 illustrates a side elevational view of a portable utility vise device with a detailed view of both a rear terminal end portion and a translation screw terminal end in accordance with some embodiments of the present invention.

As shown in FIG. 2, a side elevational view of a portable utility vise device 200 with a detailed view of both a rear terminal end portion 210 and a translation screw terminal end 220 is provided. The rear terminal end portion 210 may comprise a rear clamp jaw pin 212 which secures a rear clamp jaw 216 to a clamp bar 202. The clamp bar 202 is disposed within a vise carriage channel 204. The rear clamp jaw 216 may comprise a clamp pad 214 disposed on an inner surface thereof. The translation screw terminal end 220 may comprise a screw stopping pin 222 which prevents the clamp bar 202 from passing beyond a clamp brake 224 which would otherwise compromise the structural integrity of the vise device 200. The translation screw terminal end 220 may also comprise a distal terminal end of the clamp bar 202 within a distal terminal end of the vise carriage channel 204.

Figure 3A:
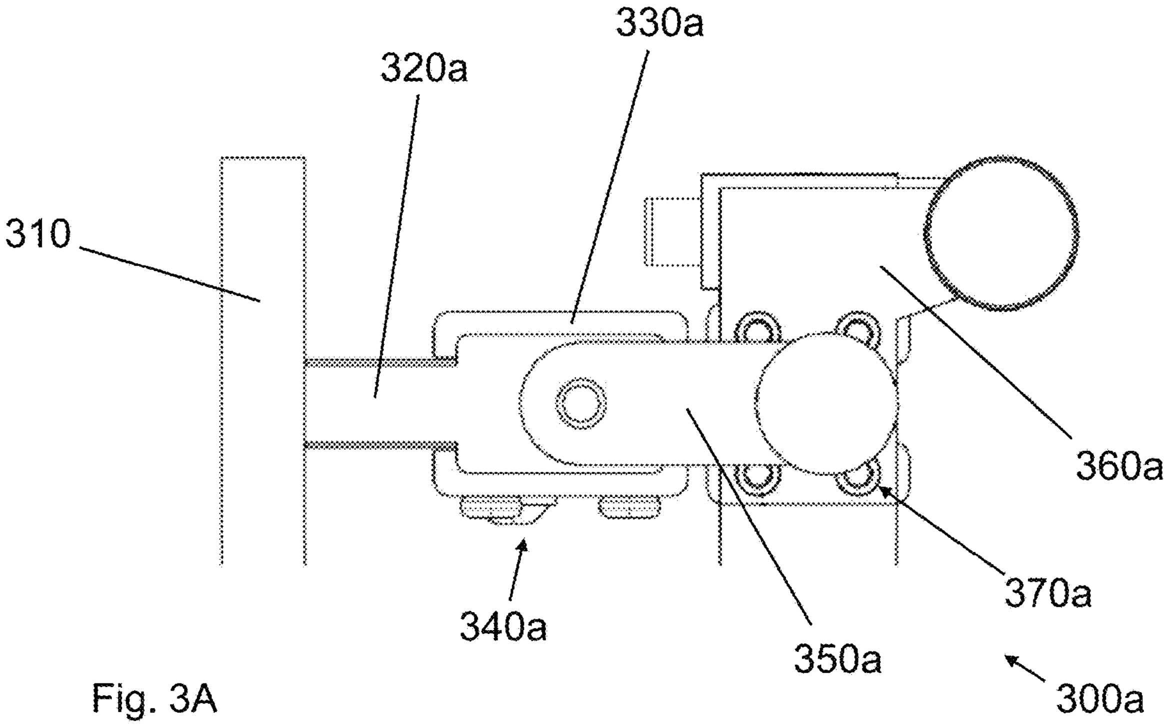
FIG. 3A illustrates a front elevational view of a right side portion of a portable utility vise device in accordance with some embodiments of the present invention.

As shown in FIG. 3A, a front elevational view of a right side portion of a portable utility vise device 300*a* is provided. The right side portion of the portable utility vise device 300*a* may comprise a right side portion of a vise jaw 310 secured to a vise carriage channel 330*a* via a fixed coupling receptacle structure 320*a* and first fasteners 340*a*. Additionally, a translation crank assembly 350*a* is secured via a fastening pin to a translation screw which is coupled to the coupling receptacle structure 320*a* and vise carriage 330*a*. Further, second fasteners 370*a* may couple a clamp screw flange 360*a* to a front elongate frame member 102*a* of FIG. 1A. The clamp screw flange 360*a* may be structurally unitary and monolithic with the frame member 102*a* or structurally distinct and coupled to the frame member 102*a*.

Figure 3B:
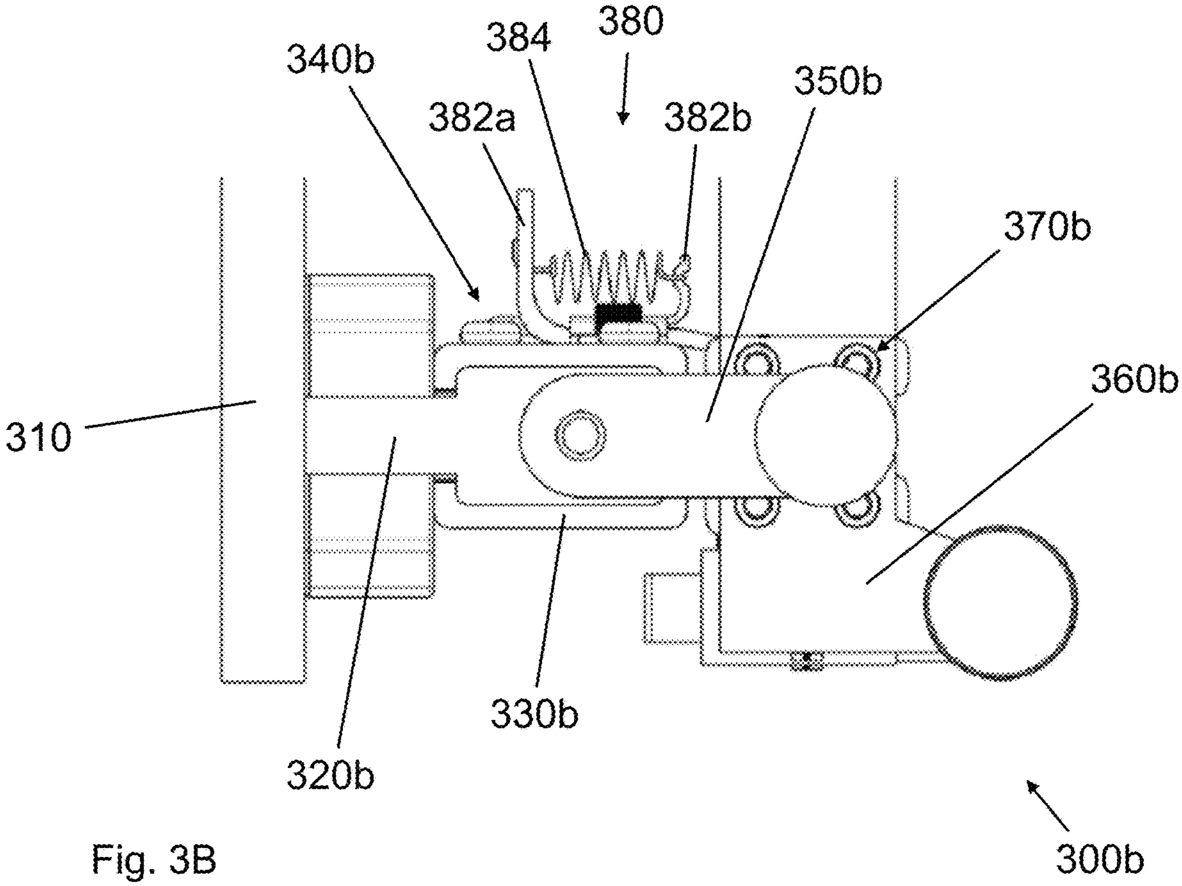
FIG. 3B illustrates a front elevational view of a left side portion of a portable utility vise device in accordance with some embodiments of the present invention.

As shown in FIG. 3B, a front elevational view of a left side portion of a portable utility vise device 300*b* is provided. The left side portion of the portable utility vise device 300*b* may comprise a left side portion of a vise jaw 310 secured to a vise carriage channel 330*b* via a fixed coupling receptacle structure 320*b* and first fasteners 340*a*. Additionally, a translation crank assembly 350*b* is secured via a fastening pin to a translation screw which is coupled to the coupling receptacle structure 320*b* and vise carriage 330*b*. Further, second fasteners 370*b* may couple a clamp screw flange 360*b* to a front elongate frame member 102*a* of FIG. 1A. The clamp screw flange 360*b* may be structurally unitary and monolithic with the frame member 102*a* or structurally distinct and coupled to the frame member 102*a*.

Moreover, a bolt latch 380 may be disposed at a position along the length of a left elongate frame member 104*b* of FIG. 1A. Specifically, the bolt latch 380 may comprise top and bottom spring hooks 382*a*, 382*b* which may maintain a restorative force element 384 in a default state. When a user lifts the top spring hook 382*a* as a handle, the restorative force element 384 is placed into a higher tension state which causes it to assume a lower tension state when the user releases the top spring hook 382*a*, such as when the user moves the bolt latch 380 from one latch slot to another along the length of the left elongate frame member 104*b* of FIG. 1A.

Figure 4:
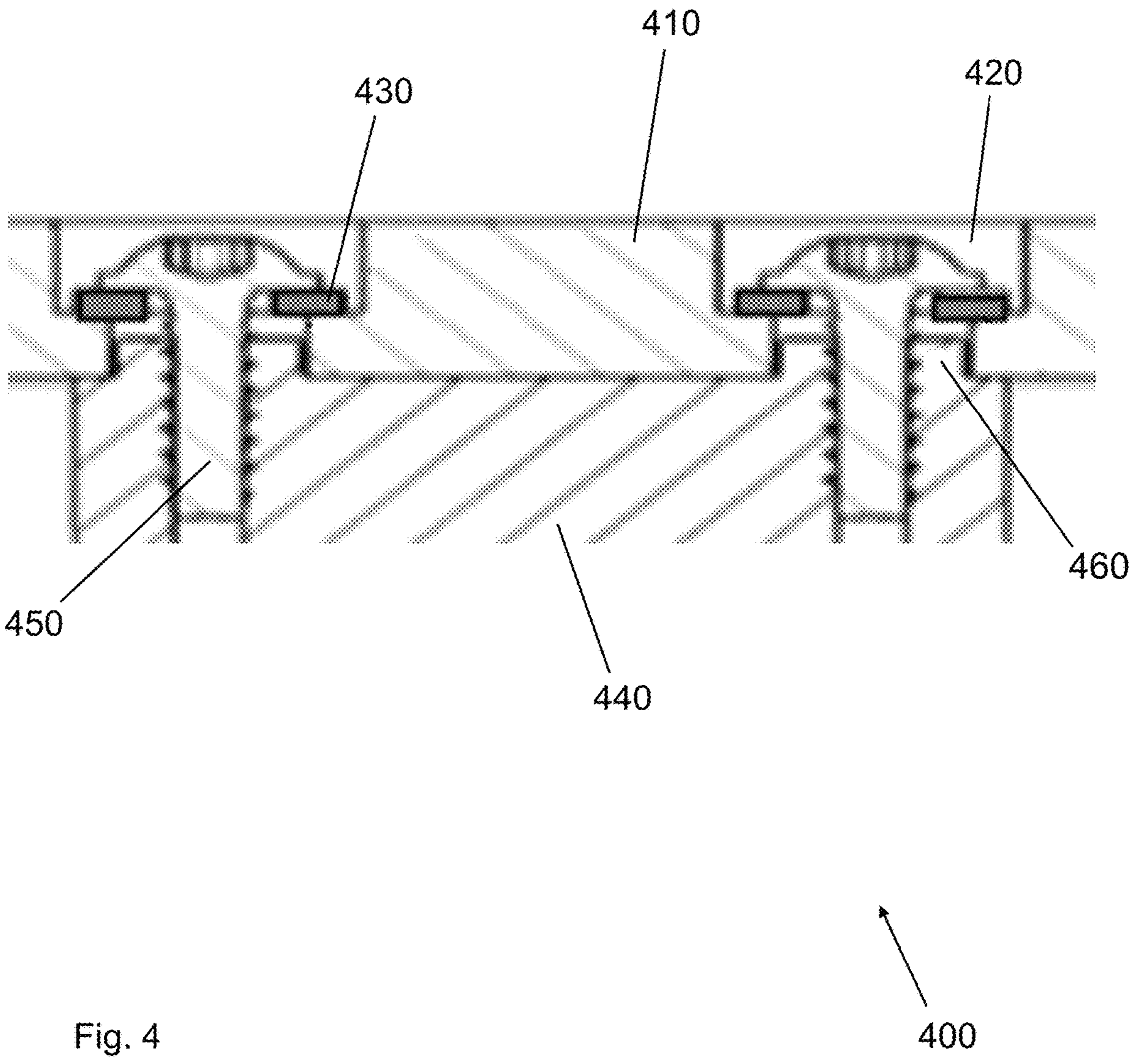
FIG. 4 illustrates a detailed cross-sectional view of a rotational clamp coupling of a portable utility vise device in accordance with some embodiments of the present invention.

As shown in FIG. 4, a detailed cross-sectional view of a rotational clamp coupling 400 of a portable utility vise device is provided. The rotational clamp coupling 400 may comprise a vise jaw 410 having a set of openings 420 disposed therein which allow a respective set of screws 450 to be inserted therethrough to be secured within a rotational coupling receptacle structure 440. The screws 450 may rest within the openings 420 and be buffered from the vise jaw 410 surface structure via respective slide washers 430. The openings 420 formed within the vise jaw 410 may comprise a general T-shape with a larger volume top portion and a smaller volume bottom portion. The slide washers 430 may rest upon the precipice between the top and bottom portions of the openings 420. However, the slide washers 430 may comprise a width or diameter that is smaller than that of the top portion opening 420 but larger than that of the bottom portion opening 420. Additionally, the rotational coupling receptacle structure 440 may comprise a set of embossed ridges 460 that are disposed within a lower portion of the smaller volume bottom portion opening 420 as shown in FIG. 4.

These features are advantageous as they allow the slide washer 430 to perform its intended functionality of sliding within the top portion opening 420 without falling through the bottom portion opening 420 which would then disadvantageous cause the screw 450 to abrade against the vise jaw 410 surface structure. Further, this allows the vise jaw 410 to rotate with minimal friction via the slide washers 430 while still keeping the screws 450 engaged within the rotational coupling receptacle structure 440 to maintain the core functionality of the vise device.

Figure 5:
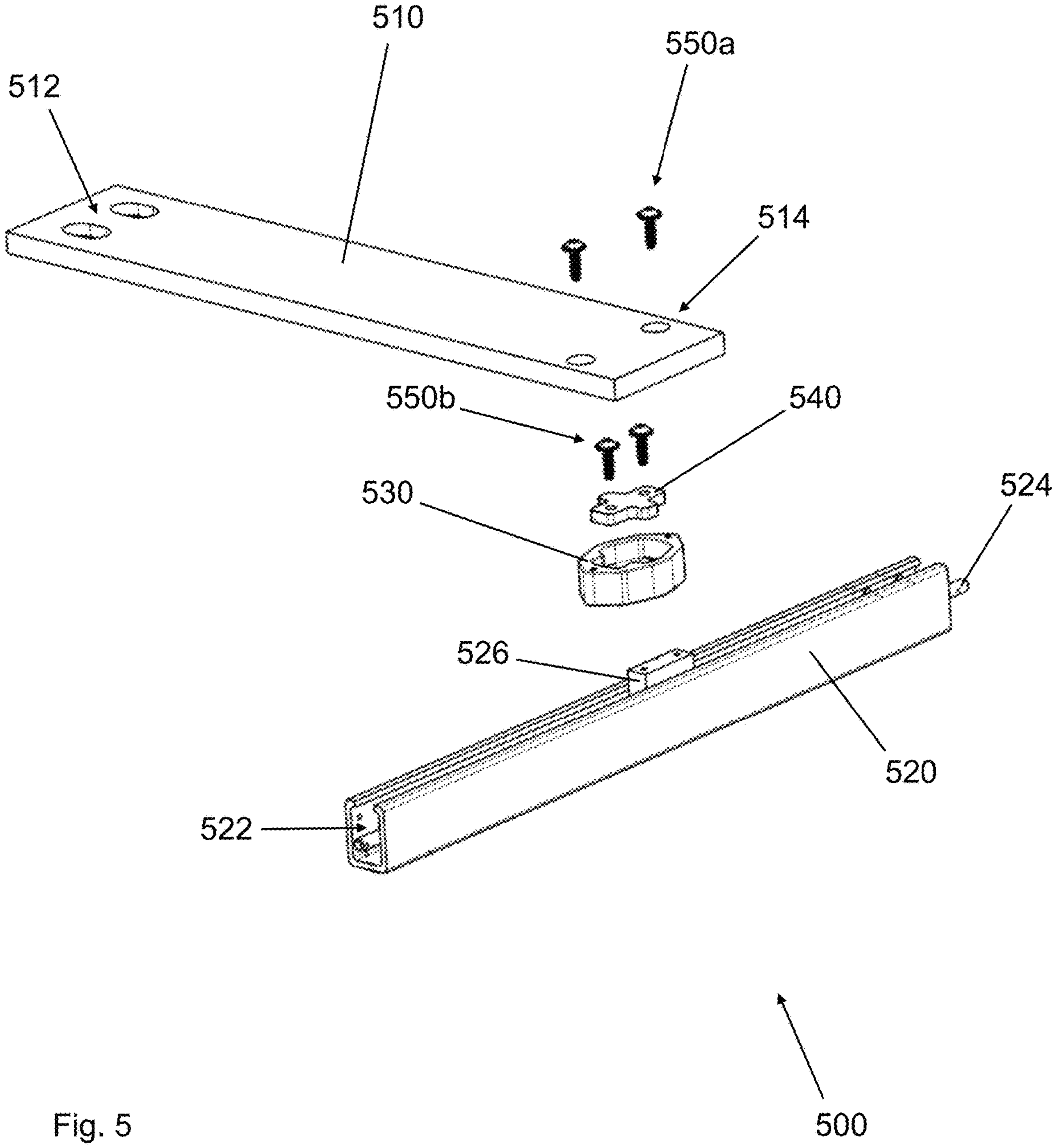
FIG. 5 illustrates an exploded view of a first end of a rotational clamp coupling of a portable utility vise device in accordance with some embodiments of the present invention.

As shown in FIG. 5, an exploded view of a first end of a rotational clamp coupling 500 of a portable utility vise device is provided. The first end of the rotational clamp coupling 500 may comprise a vise jaw 510 with a first set of coupling apertures 512 and a second set of coupling apertures 514 disposed at opposite ends of the vise jaw 510. The first set of coupling apertures 512 may be disposed distal relative the first end of the rotational clamp coupling 500. The second set of coupling apertures 514 may be disposed proximal relative the first end of the rotational clamp coupling 500 and may be secured to a vise carriage 520 which may comprise an elongate channel 522 therein having a translation screw 524 disposed therein which is the mechanism for translating a rotational coupling receptacle structure 526 therealong.

Specifically, the second set of coupling apertures 514 may have a first set of fasteners 550*a* disposed therethrough and secured within apertures formed into a hub 530. The hub 530 may be indirectly secured to the vise carriage 520 via a spindle 540 which may be directly secured via a second set of fasteners 550*b* to the rotational coupling receptacle structure 526 which is in turn connected to the vise carriage 520 as shown in FIG. 5. The spindle 540 may rotate with one degree of freedom within a top cavity formed in the hub 530 as shown in FIG. 5. This relative rotation accordingly allows the vise jaw 510 to rotate to an equal degree to allow the vise jaw 510 to accommodate a greater plethora of workpieces relative existing vise devices.

Figure 6:
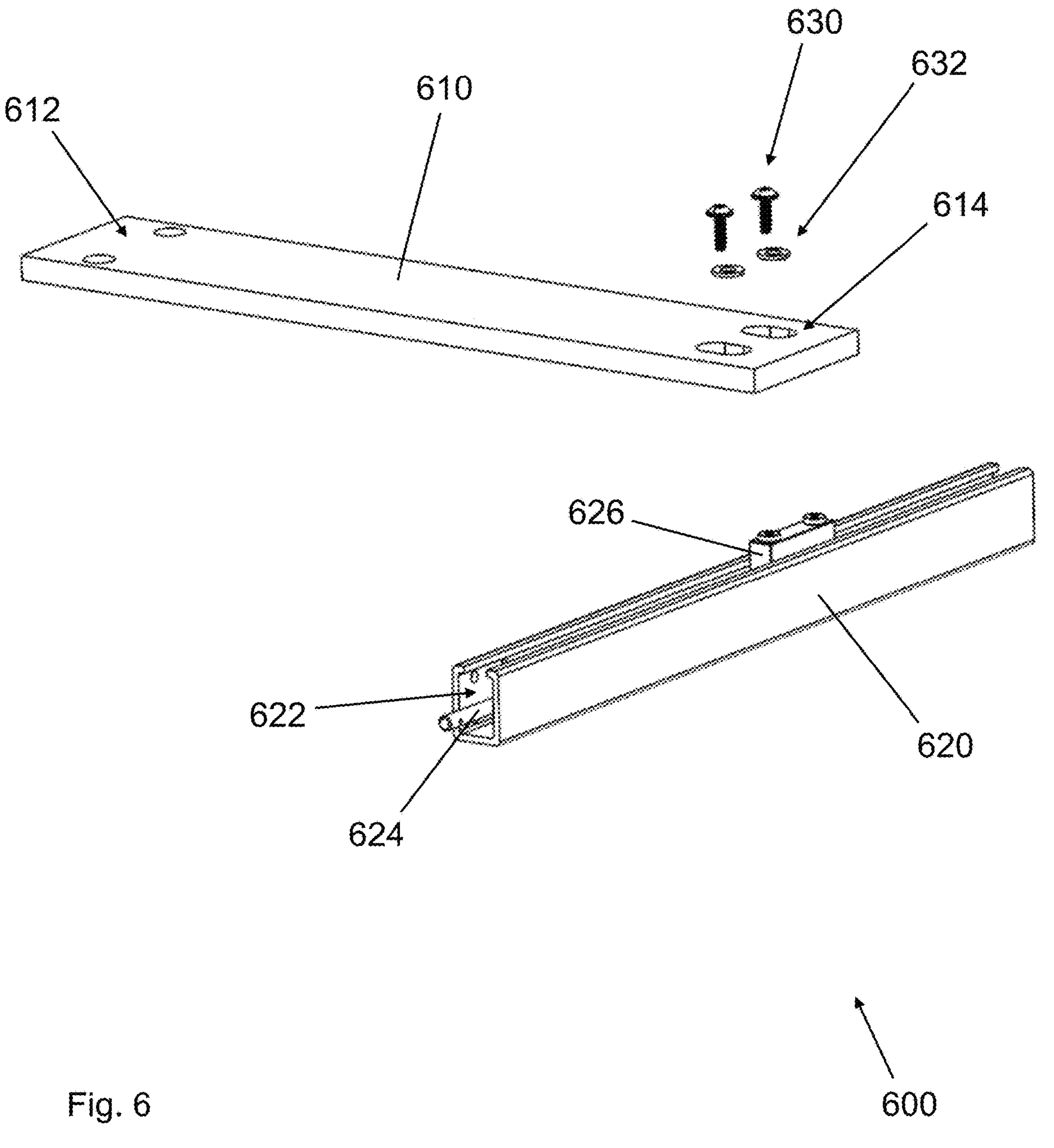
FIG. 6 illustrates an exploded view of a second end of a rotational clamp coupling of a portable utility vise device in accordance with some embodiments of the present invention.

As shown in FIG. 6, an exploded view of a second end of a rotational clamp coupling 600 of a portable utility vise device is provided. The second end of the rotational clamp coupling 600 may comprise a vise jaw 610 with a first set o coupling apertures 612 and a second set of coupling apertures 614 disposed at opposite ends of the vise jaw 610. The first set of coupling apertures 612 may be disposed distal relative the first end of the rotational clamp coupling 600. The second set of coupling apertures 614 may be disposed proximal relative the first end of the rotational clamp coupling 600 and may be secured to a vise carriage 620 which may comprise an elongate channel 622 therein having a translation screw 624 disposed therein which is the mechanism for translating a rotational coupling receptacle structure 626 therealong.

Specifically, the second set of coupling apertures 614 may have a set of fasteners 630 and slide washers 632 disposed therethrough and secured to the rotational coupling receptacle structure 626 which is in turn connected to the vise carriage 620 as shown in FIG. 6. The second end of the vise jaw 610 may rotate relative the rotational coupling receptacle structure 626, the set of fasteners 630, and/or the slide washers 632. This relative rotation accordingly allows the vise jaw 610 to accommodate a greater plethora of workpieces relative existing vise devices, such as oblong or irregularly shaped workpieces.

Figure 7:
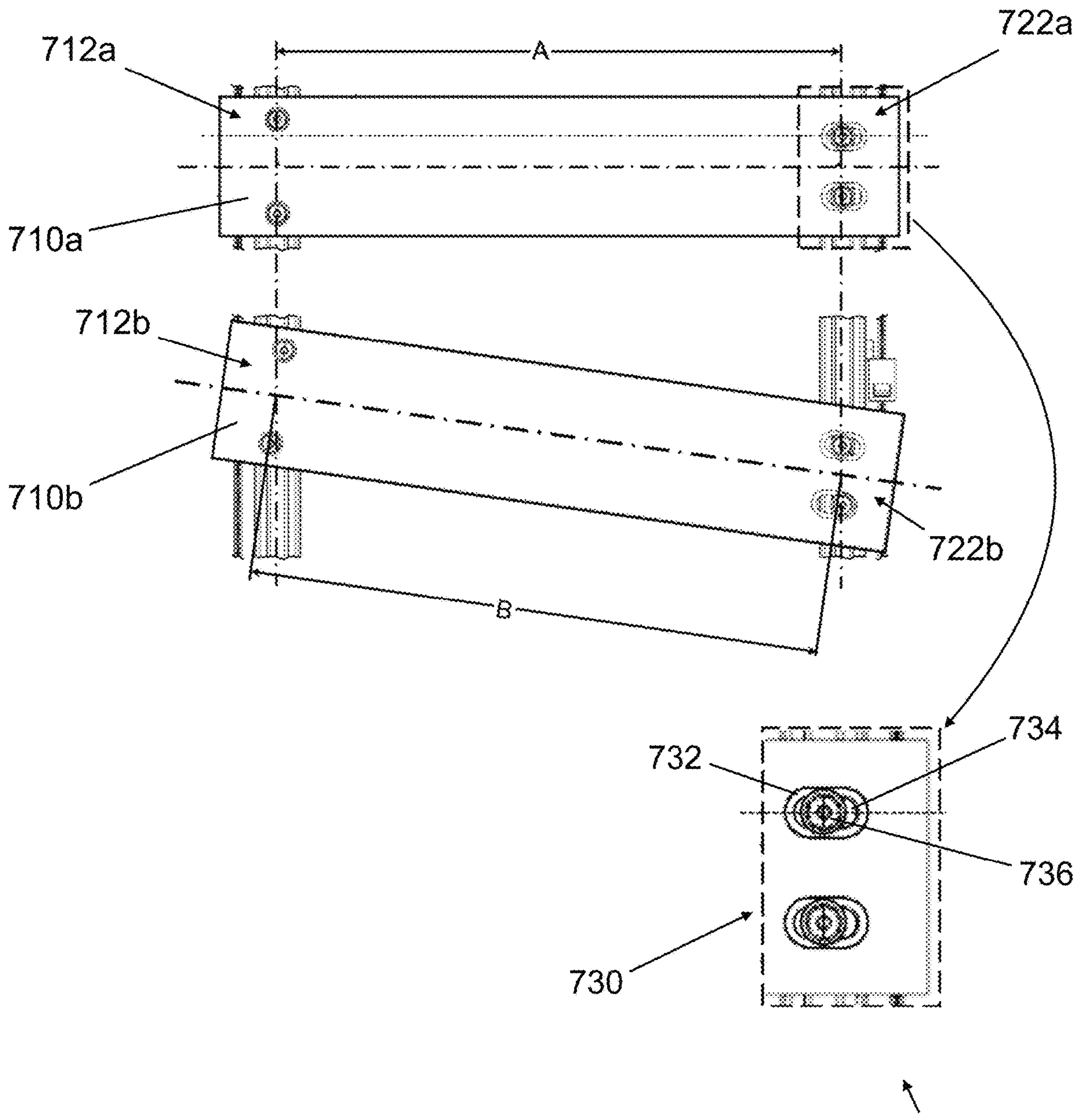
FIG. 7 illustrates an overhead top view of a rotational vise jaw in a non-rotated position and a rotated position and a detailed view of a terminal end of the rotational vise jaw of a portable utility vise device in accordance with some embodiments of the present invention.

As shown in FIG. 7, an overhead top view of a rotational vise jaw in a non-rotated position 710*a* and a rotated position 710*b* and a detailed view of a terminal end 730 of the rotational vise jaw of a portable utility vise device 700 is provided. The portable utility vise device 700 may comprise a distance A between a first set of couplings 712*a*, 722*a* of the rotational vise jaw in the non-rotated position 710*a* and a distance B between first and second sets of couplings 712*b*, 722*b* of the rotational vise jaw in the rotated position 710*b*. The distance B is greater than the distance A in order to accommodate for the rotation of the rotational vise jaw between positions 710*a*, 710*b* relative the remaining structural parts of the portable utility vise device 700 as illustrated in FIG. 7.

The detailed view of the terminal end 730 of the rotational vise jaw may comprise a set of oblong ovular coupling apertures 732 with similarly shaped opening cavities 734 disposed therethrough. A set of fasteners 736 may be disposed through the set of apertures 732 and into the opening cavities 734 as shown in FIG. 7. Given the rotational nature of the rotational vise jaw between non-rotated and rotated positions 710*a*, 710*b*, the oblong ovular coupling apertures 732 are illustrated as being in parallel alignment with the horizontal axis shown running therethrough in the non-rotated position 710*a*.

Figure 8A:
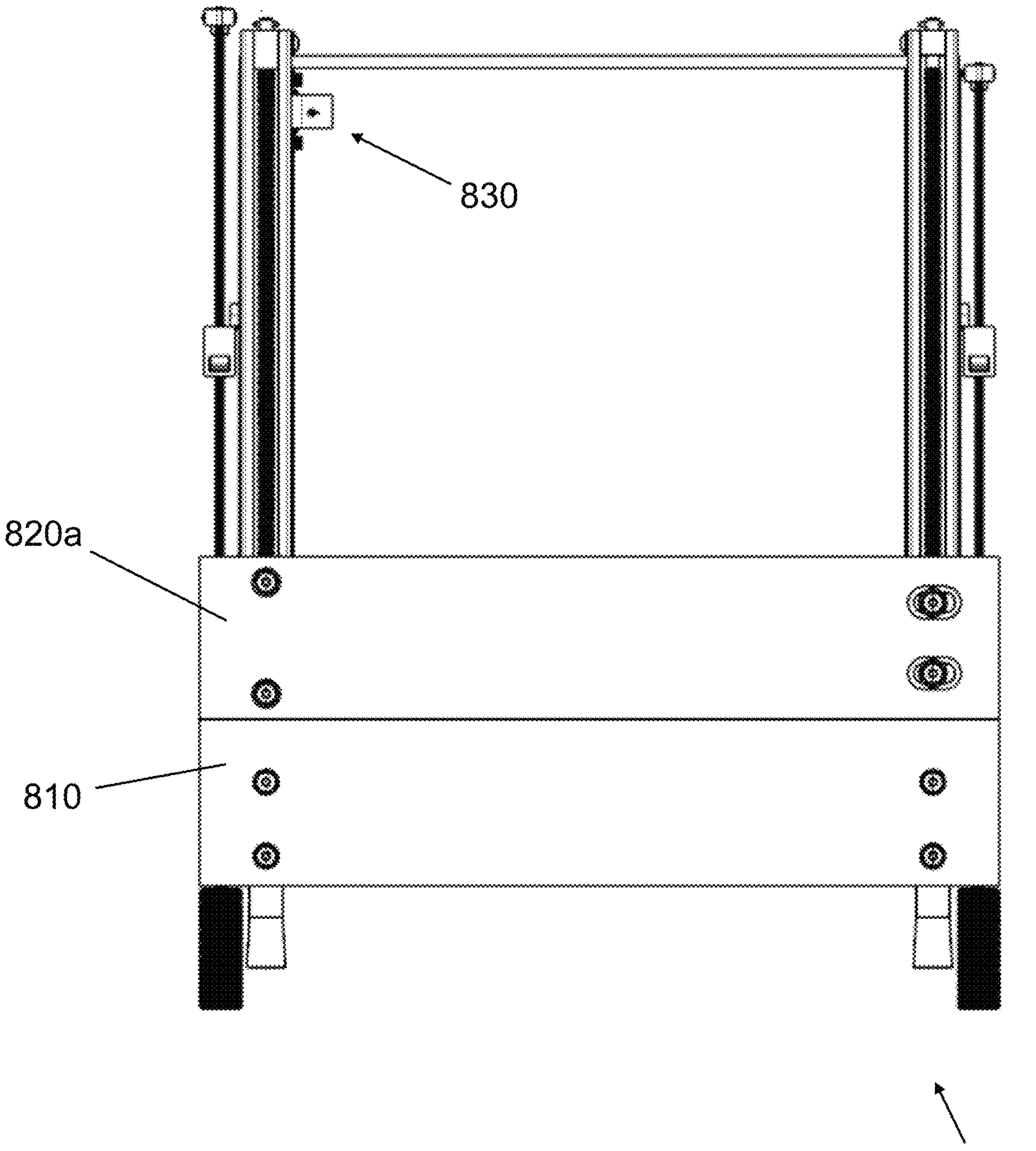
FIG. 8A illustrates an overhead view of a portable utility vise device with first and second vise jaws in a fully closed configuration in accordance with some embodiments of the present invention.

As shown in FIG. 8A, an overhead view of a portable utility vise device 800*a* with first and second vise jaws 810, 820*a* in a fully closed configuration is provided. The fully closed configuration may be defined by the second vise jaw 820*a* being translated into its furthest most proximal position relative the first vise jaw 810 such that the second vise jaw 820*a* is disposed adjacent and in side-to-side contact with the first vise jaw 810 as shown in FIG. 8A. Such translation is performed by a user turning a pair of vise cranks until the vise jaws 810, 820*a* are in their fully closed configuration. Additionally, a bolt latch 830 is illustrated as being secured in its distal most position which thereby places the first vise jaw 810 in its distal most position possible relative a clamping assembly which clamps the vise device 800*a* in place against a base structure for stabilization.

Figure 8B:
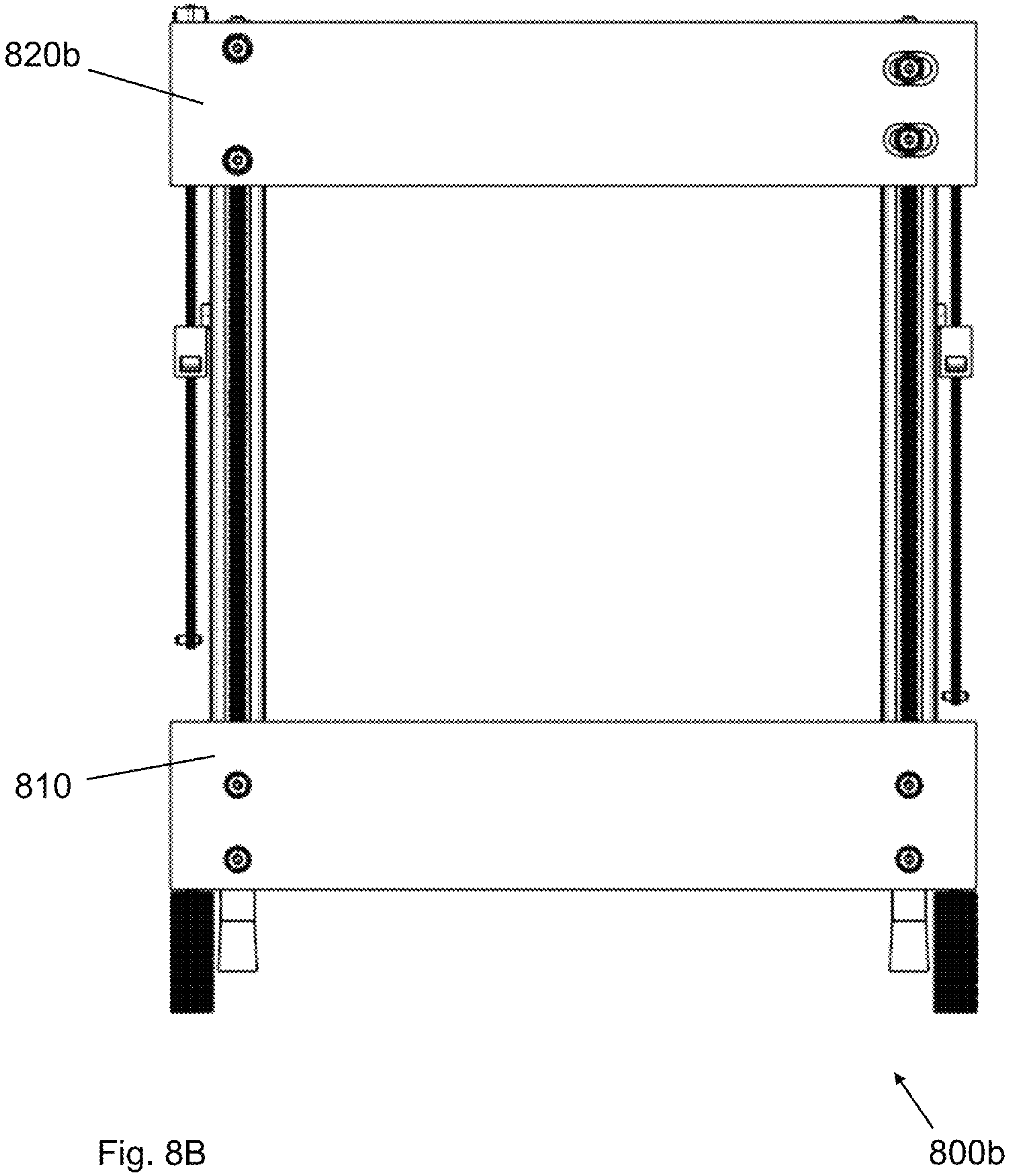
FIG. 8B illustrates an overhead view of a portable utility vise device with first and second vise jaws in a fully separated configuration in accordance with some embodiments of the present invention.

As shown in FIG. 8B, an overhead view of a portable utility vise device 800*b* with first and second vise jaws 810, 820*b* in a fully separated configuration is provided. The fully separated configuration may be defined by the second vise jaw 820*b* being translated into its furthest most distal position relative the first vise jaw 810 such that the second vise jaw 820*b* is disposed adjacent and in side-to-side contact with a distal terminal end of vise carriage channels and translation screws as shown in FIG. 8B. Such translation is performed by a user turning a pair of vise cranks until the vise jaws 810, 820*b* are in the fully separated configuration.

Figure 8C:
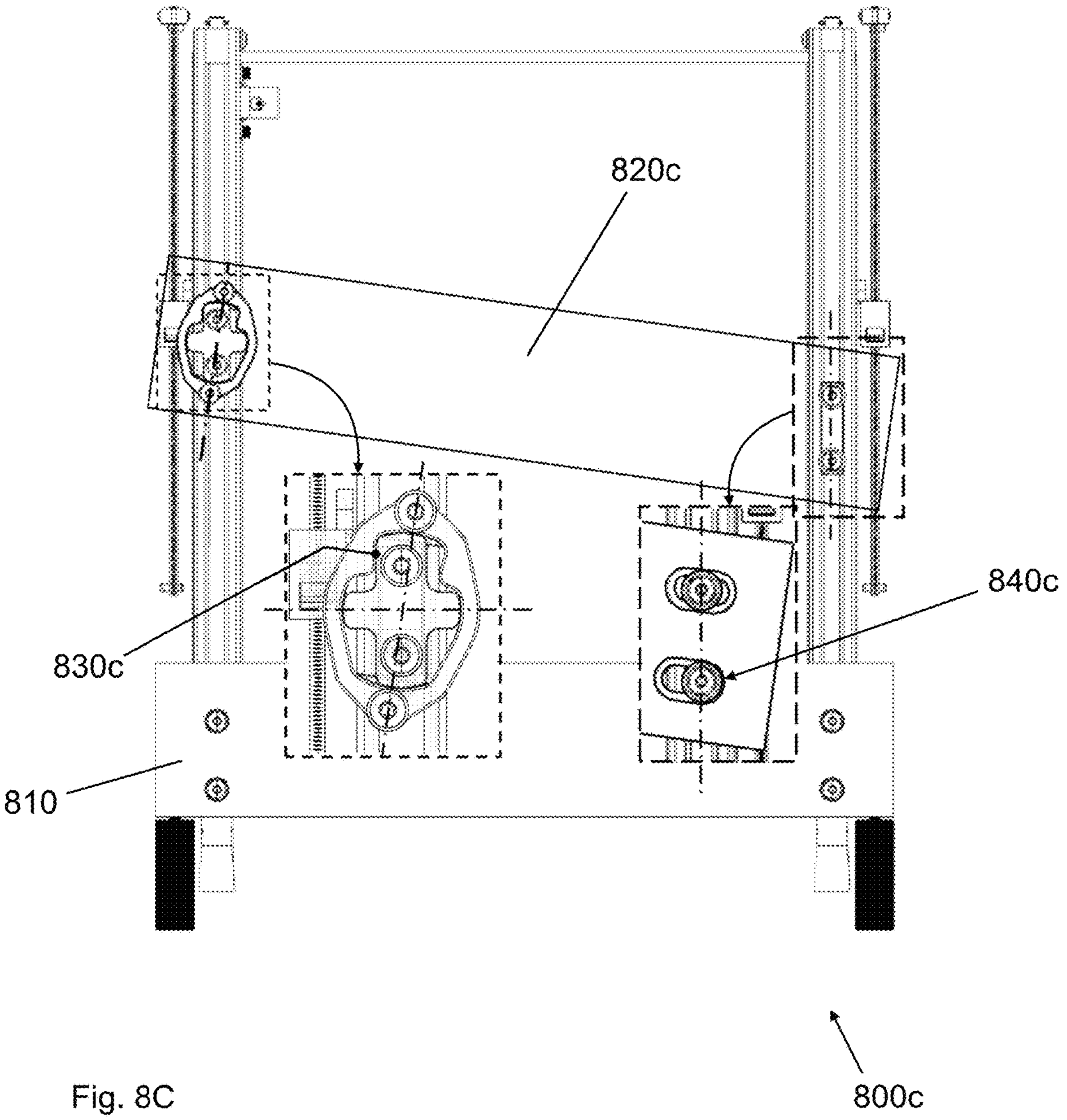
FIG. 8C illustrates an overhead view of a portable utility vise device with first and second vise jaws in a first fully rotated configuration relative one another and detailed views of each terminal end thereof in accordance with some embodiments of the present invention.

As shown in FIG. 8C, an overhead view of a portable utility vise device 800*c* with first and second vise jaws 810, 820*c* in a first fully rotated configuration relative one another and detailed views of each left and right side terminal end thereof is provided. The first fully rotated configuration may be defined by the second vise jaw 820*c* being rotated clockwise by translating the right side of the vise jaw 820*c* to its furthest most proximal position relative the left side of the vise jaw 820*c* which remains in a fixed position. Alternatively, the first fully rotated configuration may be defined by the second vise jaw 820*c* being rotated clockwise by translating the left side of the vise jaw 820*c* to its furthest most distal position relative the right side of the vise jaw 820*c* which remains in a fixed position.

The detailed views of each left and right side terminal end of the second vise jaw 820*c* are also illustrated in FIG. 8C. The detailed view of the left side of the second vise jaw 820*c* illustrates the hub 530 and the spindle 540 of FIG. 5 being in a first fully rotated configuration relative one another which corresponds the first fully rotated configuration between the first and second vise jaws 810, 820*c*. Specifically, the rotation between the hub 530 and spindle 540 may comprise a left stop point 830*c* at which the hub 530 cannot rotate clockwise any further due to impingement upon the spindle 540. Similarly, in this fully rotated configuration, the fasteners 630 of FIG. 6 hit a right stop point 840*c* which is defined by one of the fasteners 630 impinging upon an outer extent of one of the oblong ovular coupling apertures 614 of FIG. 6 and shown in FIG. 8C.

Figure 8D:
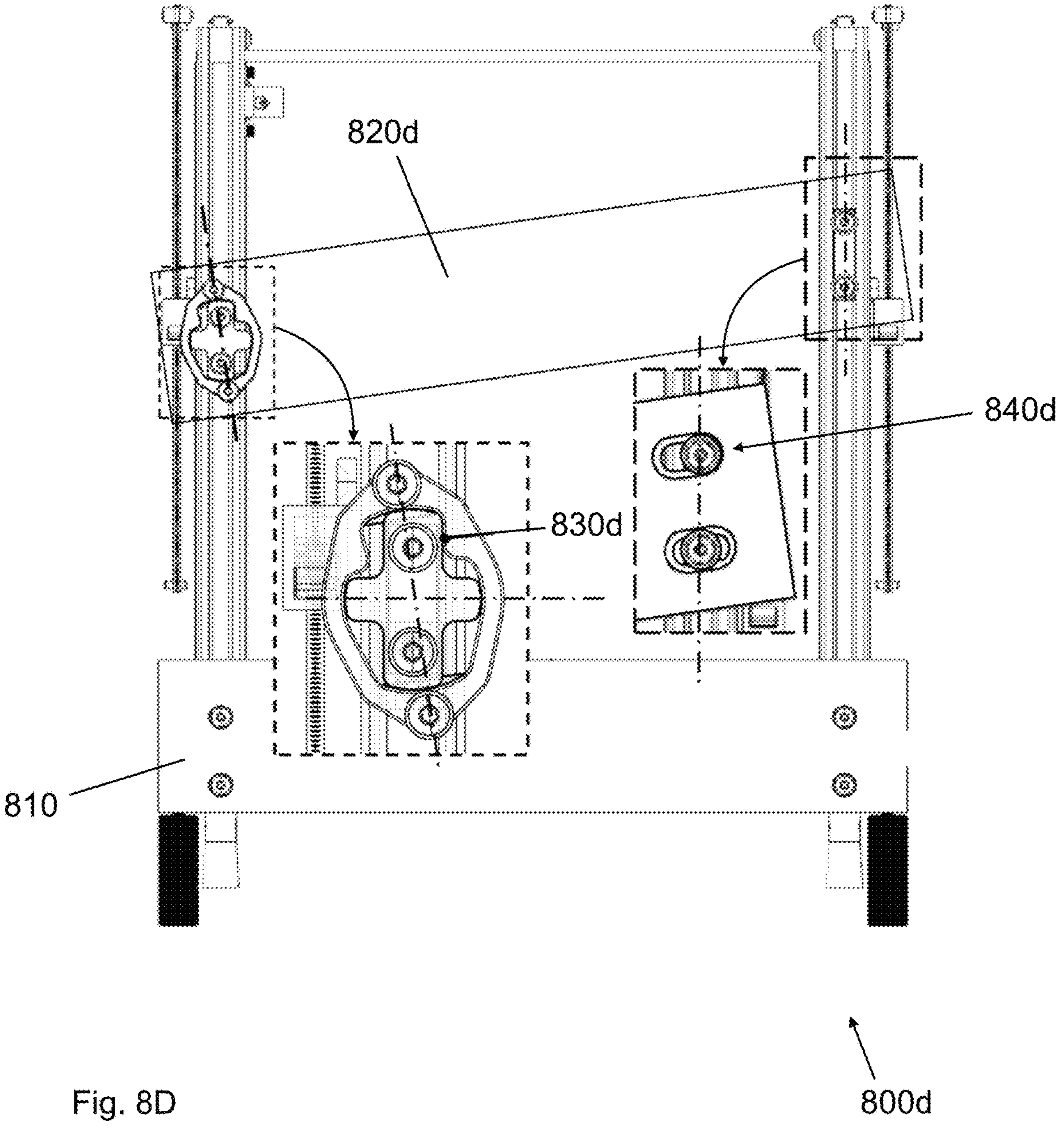
FIG. 8D illustrates an overhead view of a portable utility vise device with first and second vise jaws in a second fully rotated configuration relative one another and detailed views of each terminal end thereof in accordance with some embodiments of the present invention.

As shown in FIG. 8D, an overhead view of a portable utility vise device 800*d* with first and second vise jaws 810, 820*d* in a second fully rotated configuration relative one another and detailed views of each terminal end thereof is provided. The second fully rotated configuration may be defined by the second vise jaw 820*d* being rotated counterclockwise by translating the right side of the vise jaw 820*d* to its furthest most distal position relative the left side of the vise jaw 820*d* which remains in a fixed position. Alternatively, the first fully rotated configuration may be defined by the second vise jaw 820*d* being rotated counterclockwise by translating the left side of the vise jaw 820*d* to its furthest most proximal position relative the right side of the vise jaw 820*d* which remains in a fixed position.

The detailed views of each left and right side terminal end of the second vise jaw 820*d* are also illustrated in FIG. 8D. The detailed view of the left side of the second vise jaw 820*d* illustrates the hub 530 and the spindle 540 of FIG. 5 being in a first fully rotated configuration relative one another which corresponds the first fully rotated configuration between the first and second vise jaws 810, 820*d*. Specifically, the rotation between the hub 530 and spindle 540 may comprise a right stop point 830*d* at which the hub 530 cannot rotate counterclockwise any further due to impingement upon the spindle 540. Similarly, in this fully rotated configuration, the fasteners 630 of FIG. 6 hit a right stop point 840*d* which is defined by one of the fasteners 630 impinging upon an outer extent of one of the oblong ovular coupling apertures 614 of FIG. 6 and shown in FIG. 8D.

With regard to FIGS. 8C-8D, the optimal performance of the second vise jaw 820*c*, 820*d* of the portable utility vise device 800*c*, 800*d* is achieved through precise rotational limitations relative to the hub 530 and spindle 540 of FIG. 5, as depicted in FIGS. 8C and 8D. A preferred angular rotation of +/−8 degrees relative to the spindle has been identified as ideal, providing a balance between secure clamping and operational flexibility. However, a general range of rotation between +/−5 to 10 degrees has been found advantageous, particularly given the shape and friction characteristics between the hub 530 and spindle 540 and related interacting structural components.

Further, this range allows for sufficient grip and stability when handling a variety of workpiece geometries while also accommodating minor misalignments that may occur during use. The defined angular range ensures that the vise can adapt to different work scenarios, enhancing the device's versatility. The +/−5 to 10 degrees range not only offers a practical span for rotational movement but also mitigates the risk of over-tightening, which can lead to material deformation or tool damage. This careful consideration of rotational boundaries within the design of the portable utility vise device is a testament to its user-centric engineering, prioritizing ease of use without compromising the integrity of the workpiece or the device itself.

Additionally, in the design of the portable utility vise device, the oblong ovular coupling apertures 732 of FIG. 7 serve a dual function, both facilitating and limiting the rotation of the second vise jaw 820*c*, 820*d* in tandem with the hub 530 and spindle 540 interaction. As the second vise jaw undergoes rotation, the oblong ovular coupling apertures 732 mimic this movement, with their elongated shape allowing for the angular rotation necessary to achieve the desired positioning of the jaw. The width of these apertures is critically sized to correspond with the rotational limits set by the hub and spindle, thus providing a mechanical stop at the same +/−5 to 10 degrees angular range. This design feature ensures that, as the fasteners 736 engage with the extremities of the apertures 732, they encounter resistance at the designated stopping points. This dual-stop system enhances the operational integrity of the device by preventing over-rotation, which could compromise the device's functionality or the workpiece's stability.

Figure 9:
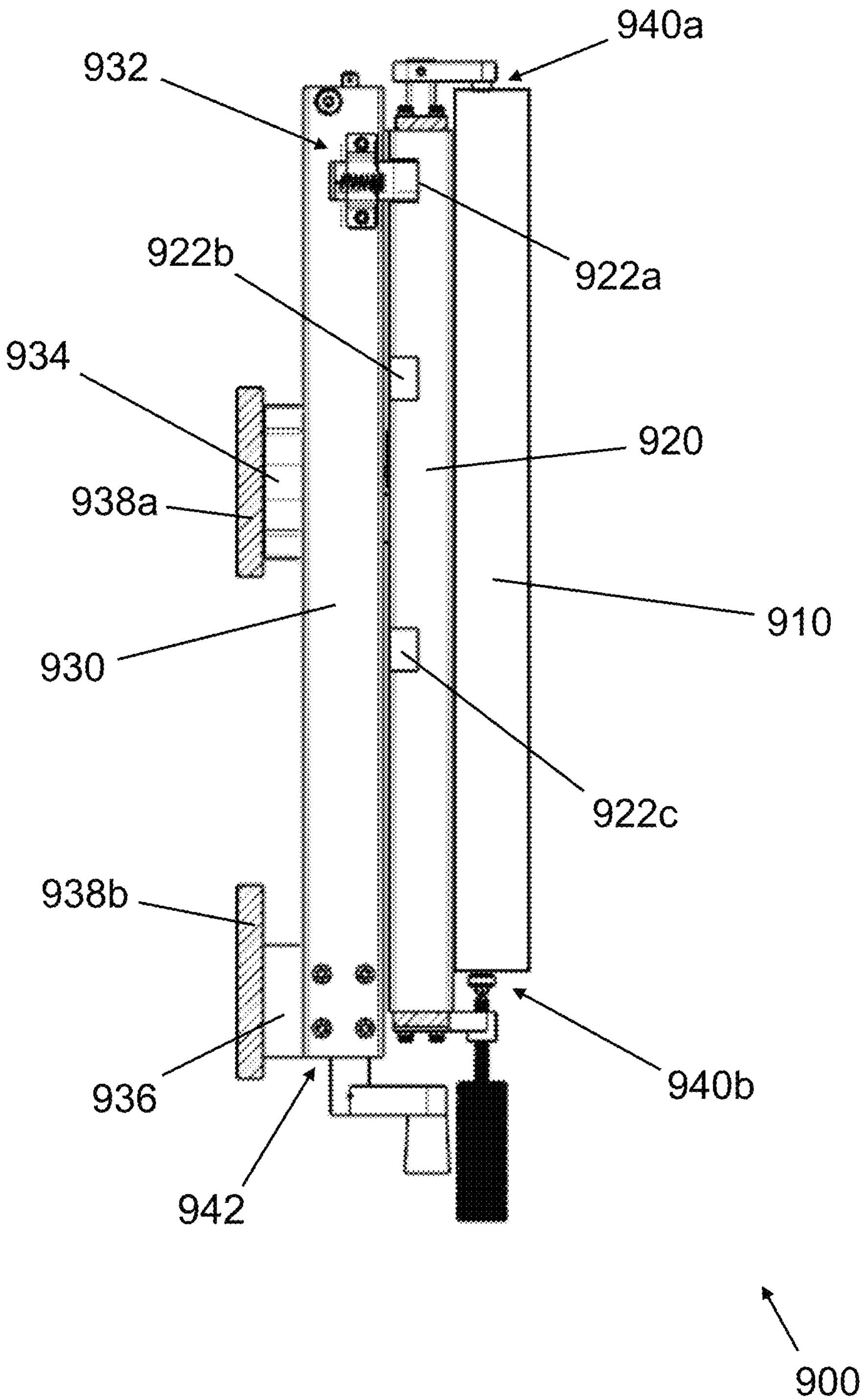
FIG. 9 illustrates a side cross-sectional view of a portable utility vise device secured to a base structure in accordance with some embodiments of the present invention.

As shown in FIG. 9, a side cross-sectional view of a portable utility vise device 900 secured to a base structure 910 is provided. The portable utility vise device 900 may comprise an elongate frame member 920 having a vise carriage 930 secured thereabove. The elongate frame member 920 may comprise clamp assembly securement mechanisms 940*a*, 940*b* disposed at either end thereof in order to secure the base structure 910 therebetween. The securement mechanisms 940*a*, 940*b* may comprise high-friction buffers or pads or other deformable high-friction materials disposed at the distal end of a translation clamp screw for robustly securing the base structure 910.

Further, the elongate frame member 920 may comprise a plurality of latch slots 922*a*-922*c* within which a bolt latch 932 may be inserted in order to secure the vise carriage 930 in a translational position relative the member 920. The vise carriage 930 may comprise a fixed coupling 936 partially securing first vise jaw 938*b* and a rotational coupling 934 partially securing a second vise jaw 938*a* to the top portion of the vise carriage 930. The fixed coupling 936 may be secured in place via a set of fasteners 942 that couple the coupling 936 directly to the vise carriage 930 as shown in FIG. 9.

Figure 10A:
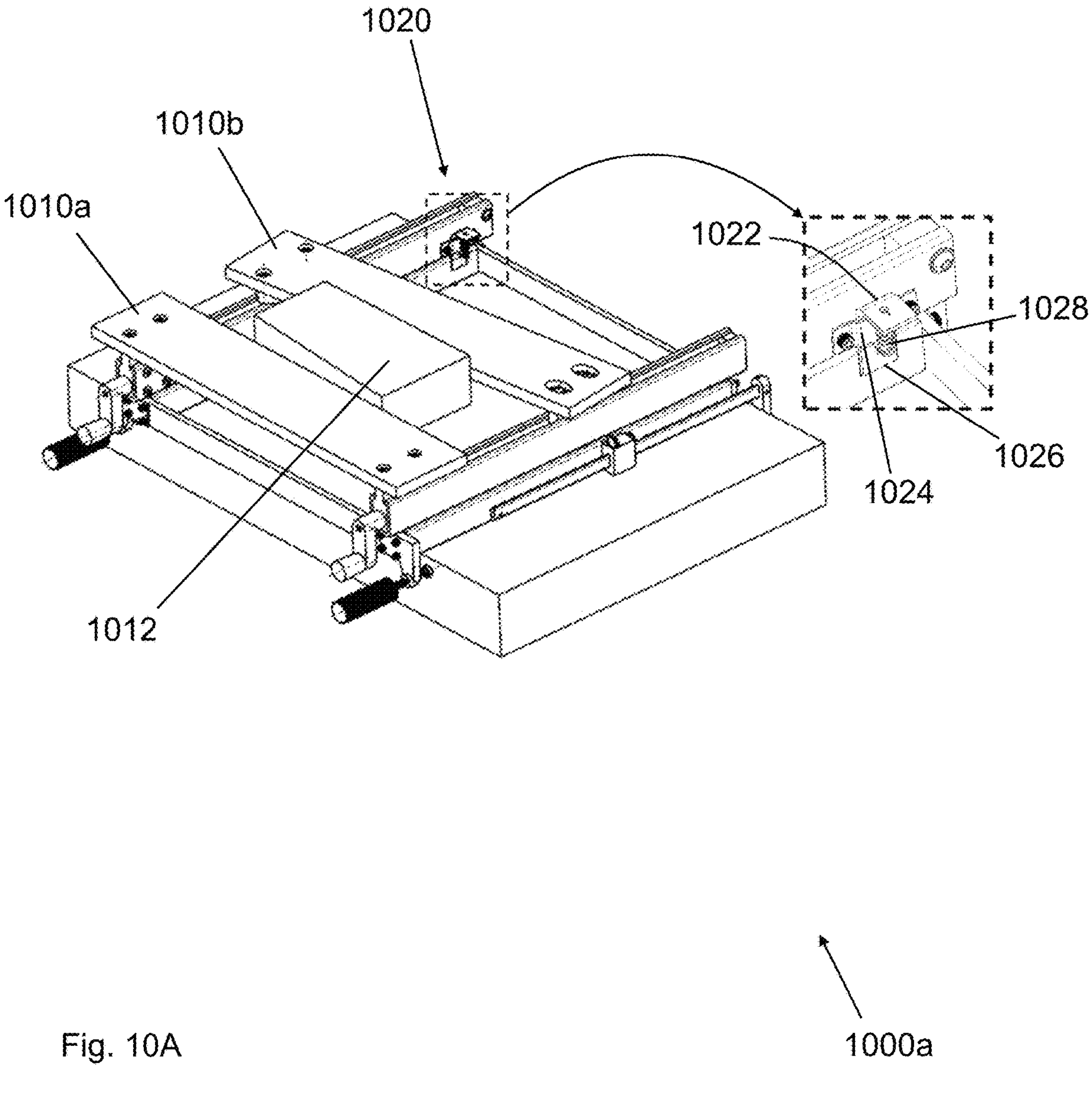
FIG. 10A illustrates a perspective view of a portable utility vise device secured to a base structure and having a trapezoidal workpiece secured between a first and second vise jaw and a detailed view of a bolt latch mechanism in accordance with some embodiments of the present invention.

As shown in FIG. 10A, a perspective view of a portable utility vise device 1000*a* secured to a base structure and having a trapezoidal workpiece 1012 secured between a first and second vise jaw 1010*a*, 1010*b* and a detailed view of a bolt latch mechanism 1020 is provided. The portable utility vise device 1000*a* may comprise the first and second vise jaw 1010*a*, 1010*b* in a rotated configuration in order to accommodate the trapezoidal shape of workpiece 1012. Further, the detailed view of the bolt latch mechanism 1020 may comprise a handle 1022 which is spring-loaded by a spring 1028 to be biased into a latch slot 1026. The handle 1022 may be retained in place partly via a horizontal support member 1024 secured in place by a pair of fasteners in order to allow the bolt latch mechanism 1020 to be removably inserted into various latch slots 1026.

Figure 10B:
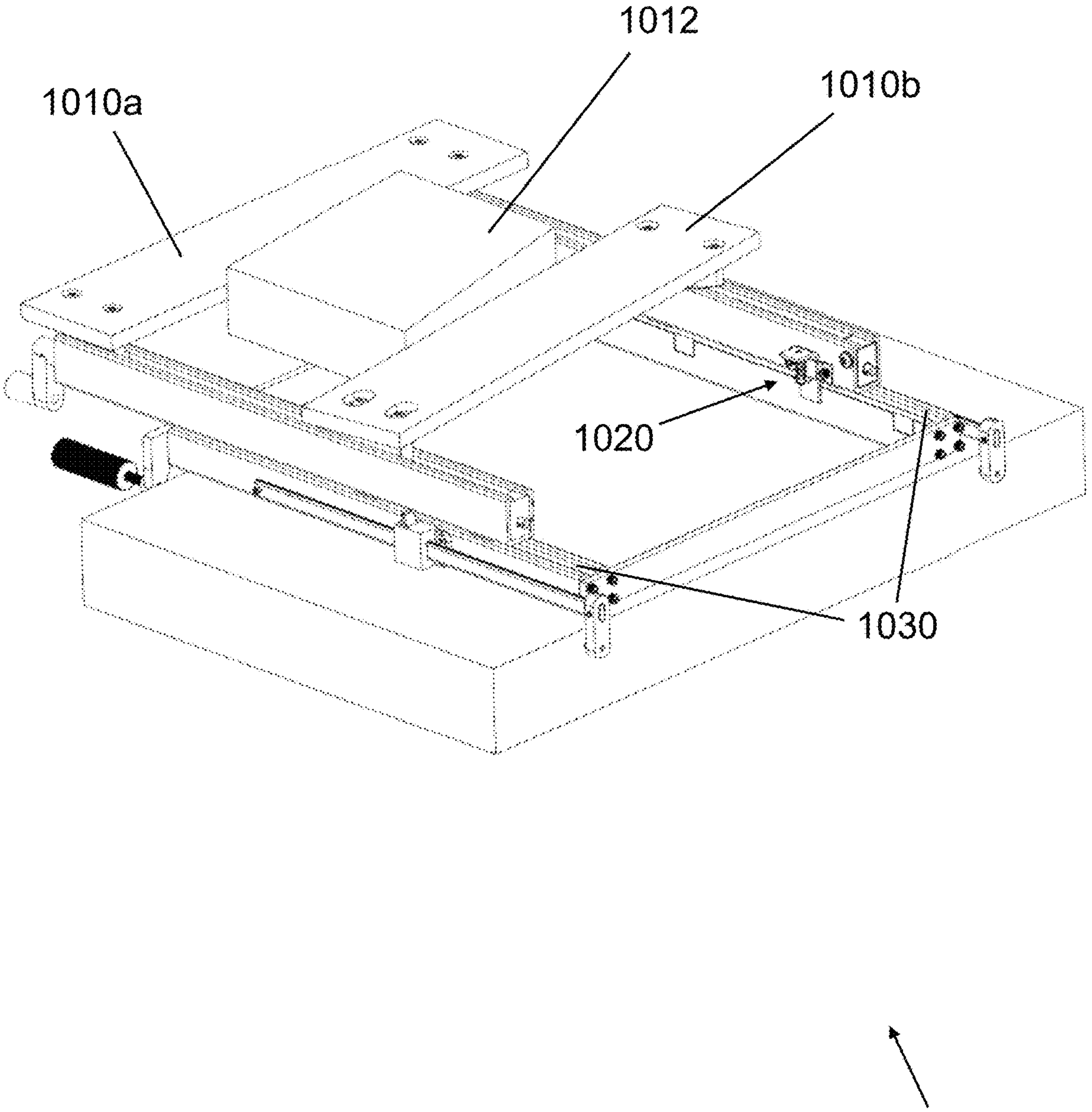
FIG. 10B illustrates a perspective view of a portable utility vise device secured to a base structure in a partial forward extended configuration and having a trapezoidal workpiece secured between a first and second vise jaw in accordance with some embodiments of the present invention.

As shown in FIG. 10B, a perspective view of a portable utility vise device 1000*b* secured to a base structure in a partial forward extended configuration and having a trapezoidal workpiece 1012 secured between a first and second vise jaw 1010*a*, 1010*b* is provided. The portable utility vise device 1000*b* may comprise the first and second vise jaw 1010*a*, 1010*b* in a rotated configuration in order to accommodate the trapezoidal shape of workpiece 1012. Further, the bolt latch mechanism 1020 is shown as being disposed in a middle latch slot which places the vise device 1000*b* in the partial forward extended configuration, thereby exposing rail tracks 1030 upon a top portion of respective elongate frame members as shown in FIG. 10B.

Figure 10C:
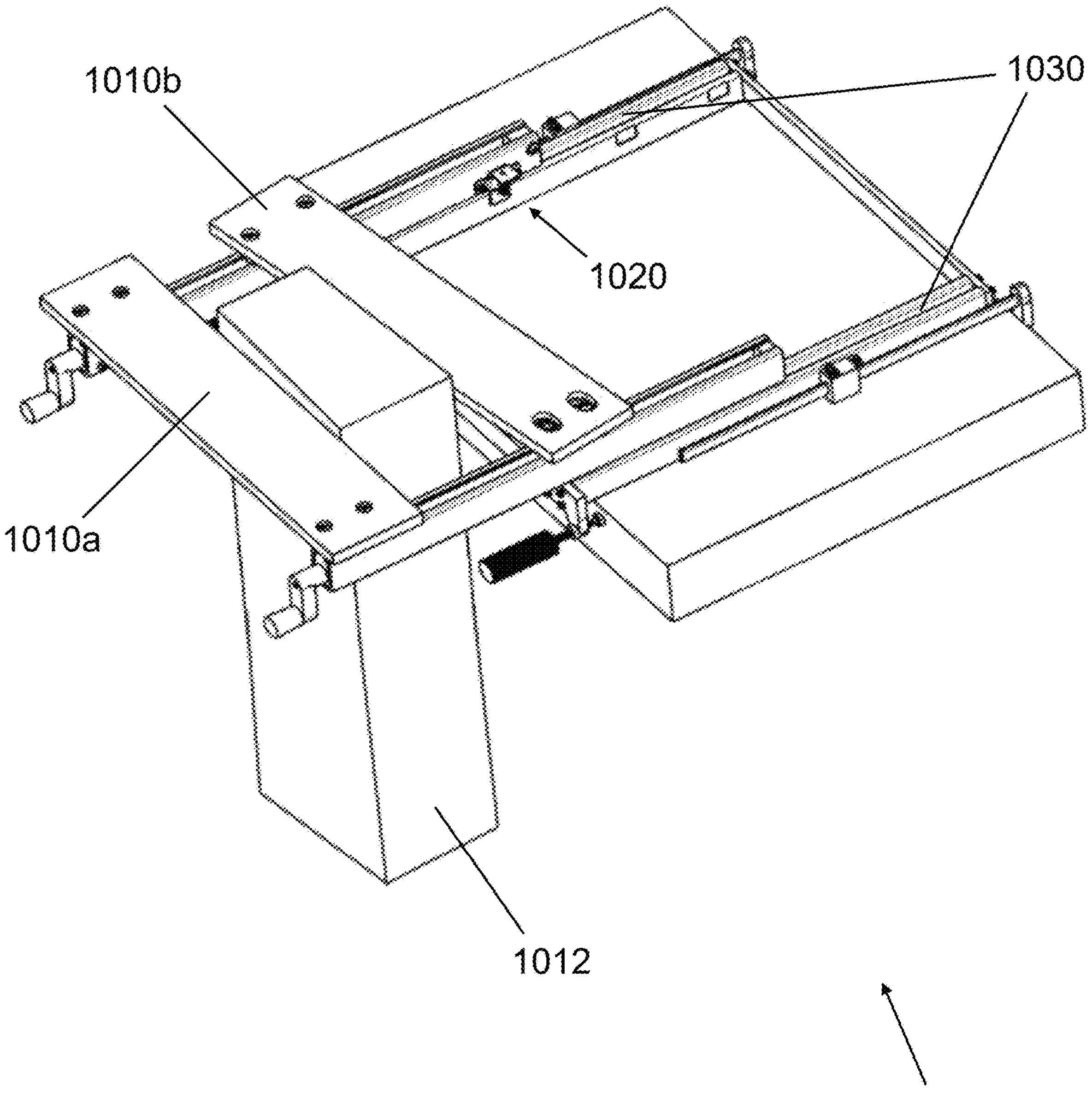
FIG. 10C illustrates a perspective view of a portable utility vise device secured to a base structure in a fully forward extended configuration and having an elongate workpiece secured between a first and second vise jaw in accordance with some embodiments of the present invention.

As shown in FIG. 10C, a perspective view of a portable utility vise device 1000*c* secured to a base structure in a fully forward extended configuration and having an elongate workpiece 1012 secured between a first and second vise jaw 1010*a*, 1010*b* is provided. The portable utility vise device 1000*c* may comprise the first and second vise jaw 1010*a*, 1010*b* in a rotated configuration in order to accommodate the trapezoidal shape of workpiece 1012. Further, the bolt latch mechanism 1020 is shown as being disposed in a proximal latch slot which places the vise device 1000*c* in the fully forward extended configuration, thereby exposing rail tracks 1030 upon a top portion of respective elongate frame members as shown in FIG. 10B. In the fully forward extended configuration, the proximal extent of the second vise jaw 1010*b* is disposed beyond the proximal extent of the base structure such that the elongate workpiece 1012 may be disposed entirely in front of the base structure and may extend below the base structure to provide the user with a user-friendly easy means of working on an oblong or irregular workpiece such as the elongate workpiece 1012 in a position as desired by the user without impinging upon the base structure.

Figure 11:
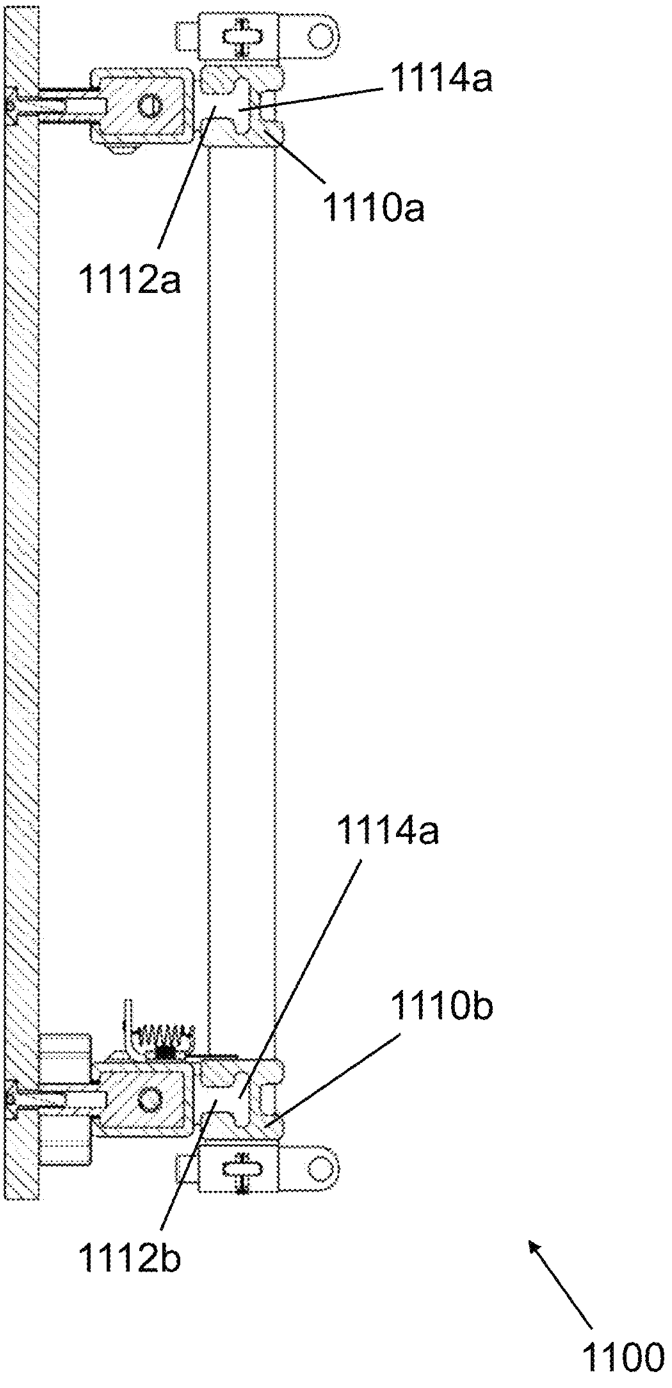
FIG. 11 illustrates a side cross-sectional view of a portable utility vise device with first and second shoe slides shown in accordance with some embodiments of the present invention.

As shown in FIG. 11, a side cross-sectional view of a portable utility vise device 1100 with first and second shoe slides 1112*a*, 1112*b* shown is provided. The portable utility vise device 1100 may comprise left and right elongate frame members 1110*a*, 1110*b* having respective elongate cavities 1114*a*, 1114*b* therein. The first and second shoe slides 1112*a*, 1112*b* may be disposed within respective elongate cavities 1114*a*, 1114*b* such that the shoe slides 1112*a*, 1112*b* may translate therethrough as a user translates the vise carriages between the distal, partially forward extended, and fully forward extended configurations via the bolt latch mechanism being inserted into the associated latch slots. The first and second shoe slides 1112*a*, 1112*b* may be the means by which the vise carriages are secured to respective elongate frame members. In order to translate effectively, the first and second shoe slides 1112*a*, 1112*b* may comprise a low-friction coating disposed thereover in order to reduce translational friction which, over time, would otherwise degrade the structural integrity of both the shoe slides 1112*a*, 1112*b* and the frame members while degrading the functionality of the vise device 1100 overall.

The structural integrity and adaptability of the portable utility vise device are significantly enhanced by the incorporation of slide shoes 1112*a*, 1112*b* within the frame members 1110*a*, 1110*b*. These slide shoes 1112*a*, 1112*b* facilitate smooth translational movement along the frame members 1110*a*, 1110*b*, ensuring that adjustments can be made with minimal effort. This feature is particularly advantageous as it reduces wear and tear on both the carriages and the frame members, extending the lifespan of the device 1100 and maintaining precision in vise jaw alignment over time. Moreover, while only the first and second shoe slides 1112*a*, 1112*b* are shown in the cross-sectional view of FIG. 11, it is understood that another set of shoe slides may be utilized along the length of the vise carriages such that multiple sets of shoe slides may be utilized to translate the vise carriages along respective left and right elongate frame members 1110*a*, 1110*b*.

In some embodiments of FIGS. 1A-11, a portable utility vise device is provided comprising: a clamping assembly comprising a front elongate frame member, a rear elongate frame member, a left elongate frame member and a right elongate frame member, wherein: the left and right elongate frame members each comprise a clamp bar coupled to an outer side surface thereof, each clamp bar comprises a rear clamp jaw disposed at a distal terminal end thereof, and the front elongate frame member comprises a clamp screw assembly; and a vise assembly coupled to the clamping assembly and comprising a left vise carriage and a right vise carriage, wherein: the left and right vise carriages each comprise an elongate channel and a translation screw disposed therein, the left and right vise carriages each comprise at least one coupling receptacle structure partially disposed within their respective elongate channels, and each of the at least one coupling receptacle structures secure either a first vise jaw or a second vise jaw to their respective vise carriages.

In some embodiments of FIGS. 1A-11, the clamping assembly is structured to secure a base structure therein, and the base structure stabilizes operation of the vise assembly.

In some embodiments of FIGS. 1A-11, the vise assembly is coupled above the clamping assembly, the vise assembly translates across the clamping assembly, the vise assembly comprises a bolt latch mechanism, the bolt latch mechanism is removably secured within the clamp assembly, and the vise assembly does not translate across the clamping assembly when the bolt latch mechanism is secured within the clamping assembly.

In some embodiments of FIGS. 1A-11, the vise assembly translates between a distal configuration, a partial forward extended configuration, and a fully forward extended configuration, the vise assembly is in the distal configuration, the partial forward extended configuration, or the fully forward extended configuration only when a bolt latch of the vise assembly is secured within the clamp assembly, and, in the partial forward extended configuration and the fully forward extended configuration, at least one of the first and second vise jaws extends beyond the front elongate frame member.

In some embodiments of FIGS. 1A-11, the first and second vise jaws move relative one another along the left and right vise carriages, and turning of the vise crank moves the first and second vise jaws relative one another.

In some embodiments of FIGS. 1A-11, the clamp screw assembly comprises a front clamp jaw, the front clamp jaw comprises a clamp assembly securement mechanism, the clamp assembly securement mechanism comprises a high-friction deformable pad, the high-friction deformable pad is disposed at the distal end of a translation clamp screw, and the clamp screw assembly is rotated to adjust the front clamp jaw until the front and rear clamp jaws robustly secure a base structure.

In some embodiments of FIGS. 1A-11, a portable utility vise device comprising: a clamping assembly comprising a front elongate frame member, a rear elongate frame member, a left elongate frame member and a right elongate frame member, wherein: the left and right elongate frame members each comprise a clamp bar coupled to an outer side surface thereof via respective clamp brakes, each clamp bar is movable relative to the left and right elongate frame members, each clamp bar comprises a rear clamp jaw disposed at a distal terminal end thereof, and the front elongate frame member comprises a left clamp screw assembly disposed at a left terminal end thereof and a right clamp screw assembly disposed at a right terminal end thereof; and a vise assembly coupled to the clamping assembly and comprising a left vise carriage and a right vise carriage, wherein: the left and right vise carriages each comprise an elongate channel and a translation screw disposed therein, the left and right vise carriages each comprise at least one coupling receptacle structure partially disposed within their respective elongate channels, and each of the at least one coupling receptacle structures secure either a first vise jaw or a second vise jaw to their respective vise carriages.

In some embodiments of FIGS. 1A-11, a portable utility vise device, comprising: a clamping assembly comprising a front elongate frame member, a rear elongate frame member, a left elongate frame member and a right elongate frame member, wherein: the left and right elongate frame members each comprise a clamp bar coupled to an outer side surface thereof, each clamp bar comprises a rear clamp jaw disposed at a distal terminal end thereof, and the front elongate frame member comprises a clamp screw assembly; and a vise assembly coupled to the clamping assembly and comprising a left vise carriage and a right vise carriage, wherein: the left and right vise carriages each comprise an elongate channel and a translation screw disposed therein, each translation screw comprises a front terminal end and a rear terminal end, a vise crank is coupled to the front terminal end of each translation screw, the left and right vise carriages each comprise at least one coupling receptacle structure partially disposed within their respective elongate channels, each of the at least one coupling receptacle structures secure either a first vise jaw or a second vise jaw to their respective vise carriages, each of the first and second vise jaws comprises a left terminal end and a right terminal end, each of the first and second vise jaws comprises a plurality of coupling apertures disposed therethrough, and each coupling aperture is disposed at the left terminal end or at the right terminal end.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase ‘removably coupled’ and similar terms and phrases are intended to convey that a given element may be iteratively coupled to and removed from another given element as desired. For example, a male plug of a first extension cord may be removably coupled to a female plug of a second extension cord as desired.

The use of the terms “a,” “an,” “the,” and similar referents in the context of describing the disclosed embodiments (especially in the context of the following claims) are to be construed to cover both the singular and the plural, unless otherwise indicated or clearly contradicted by context. The terms “comprising,” “having,” “including,” and “containing” are to be construed as open-ended terms (i.e., meaning “including, but not limited to,”) unless otherwise noted. The term “coupled” or” connected,” where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term “set” (e.g., “a set of items”) or “subset” unless otherwise noted or contradicted by context, is to be construed as a nonempty collection comprising one or more members. Further, unless otherwise noted or contradicted by context, the term “subset” of a corresponding set does not necessarily denote a proper subset of the corresponding set, but the subset and the corresponding set may be equal.

Conjunctive language, such as phrases of the form “at least one of A, B, and C,” or “at least one of A, B and C,” is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases “at least one of A, B, and C” and “at least one of A, B and C” refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term “plurality” indicates a state of being plural (e.g., “a plurality of items” indicates multiple items). The number of items in a plurality is at least two, but can be more when so indicated either explicitly or by context.

The use of any examples, or exemplary language (e.g., “such as”) provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A portable utility vise device, comprising:

a clamping assembly comprising a front elongate frame member, a rear elongate frame member, a left elongate frame member and a right elongate frame member, wherein:
- the left and right elongate frame members each comprise a clamp bar coupled to an outer side surface thereof,
- each clamp bar comprises a rear clamp jaw disposed at a distal terminal end thereof, and
- the front elongate frame member comprises a clamp screw assembly; and a vise assembly coupled to the clamping assembly and comprising a left vise carriage and a right vise carriage, wherein:
- the left and right vise carriages each comprise an elongate channel and a translation screw disposed therein,
- the left and right vise carriages each comprise at least one coupling receptacle structure partially disposed within their respective elongate channels,
- the at least one coupling receptacle structure of the left or right vise carriage is secured to a hub,
- the hub rotates independent of the at least one coupling receptacle structure of the left or right vise carriage,
- each of the at least one coupling receptacle structures secure either a first vise jaw or a second vise jaw to their respective vise carriages,
- the first vise jaw or the second vise jaw comprises an oblong coupling aperture disposed therethrough, and
- the oblong coupling aperture is disposed over the left or right vise carriage that is not secured to the hub.

2. The portable utility vise device of claim 1, wherein the clamping assembly is structured to secure a base structure therein.

3. The portable utility vise device of claim 2, wherein the base structure stabilizes operation of the vise assembly.

4. The portable utility vise device of claim 1, wherein the vise assembly is coupled above the clamping assembly.

5. The portable utility vise device of claim 4, wherein the vise assembly translates across the clamping assembly.

6. The portable utility vise device of claim 5, wherein the vise assembly comprises a bolt latch mechanism.

7. The portable utility vise device of claim 6, wherein the bolt latch mechanism is removably secured within the clamping assembly.

8. The portable utility vise device of claim 7, wherein the vise assembly does not translate across the clamping assembly when the bolt latch mechanism is secured within the clamping assembly.

9. The portable utility vise device of claim 5, wherein the vise assembly translates between a distal configuration, a partial forward extended configuration, and a fully forward extended configuration.

10. The portable utility vise device of claim 9, wherein the vise assembly is in the distal configuration, the partial forward extended configuration, or the fully forward extended configuration only when a bolt latch of the vise assembly is secured within the clamping assembly.

11. The portable utility vise device of claim 9, wherein, in the partial forward extended configuration and the fully forward extended configuration, at least one of the first and second vise jaws extends beyond the front elongate frame member.

12. The portable utility vise device of claim 1, wherein the first and second vise jaws move relative one another along the left and right vise carriages.

13. The portable utility vise device of claim 12, wherein turning of a vise crank moves the first and second vise jaws relative one another.

14. The portable utility vise device of claim 1, wherein the clamp screw assembly comprises a front clamp jaw.

15. The portable utility vise device of claim 14, wherein the front clamp jaw comprises a clamp assembly securement mechanism.

16. The portable utility vise device of claim 15, wherein the clamp assembly securement mechanism comprises a high-friction deformable pad.

17. The portable utility vise device of claim 16, wherein the high-friction deformable pad is disposed at the distal end of a translation clamp screw.

18. The portable utility vise device of claim 14, wherein the clamp screw assembly is rotated to adjust the front clamp jaw until the front and rear clamp jaws robustly secure a base structure.

19. A portable utility vise device, comprising:

a clamping assembly comprising a front elongate frame member, a rear elongate frame member, a left elongate frame member and a right elongate frame member, wherein:

the left and right elongate frame members each comprise a clamp bar coupled to an outer side surface thereof via respective clamp brakes, each clamp bar is movable relative to the left and right elongate frame members, each clamp bar comprises a rear clamp jaw disposed at a distal terminal end thereof, and the front elongate frame member comprises a left clamp screw assembly disposed at a left terminal end thereof and a right clamp screw assembly disposed at a right terminal end thereof; and a vise assembly coupled to the clamping assembly and comprising a left vise carriage and a right vise carriage, wherein:

the left and right vise carriages each comprise an elongate channel and a translation screw disposed therein, the left and right vise carriages each comprise at least one coupling receptacle structure partially disposed within their respective elongate channels, the at least one coupling receptacle structure of the left or right vise carriage is secured to a hub, the hub rotates independent of the at least one coupling receptacle structure of the left or right vise carriage, each of the at least one coupling receptacle structures secure either a first vise jaw or a second vise jaw to their respective vise carriages, the first vise jaw or the second vise jaw comprises an oblong coupling aperture disposed therethrough, and the oblong coupling aperture is disposed over the left or right vise carriage that is not secured to the hub.

20. A portable utility vise device, comprising:

a clamping assembly comprising a front elongate frame member, a rear elongate frame member, a left elongate frame member and a right elongate frame member, wherein:

the left and right elongate frame members each comprise a clamp bar coupled to an outer side surface thereof, each clamp bar comprises a rear clamp jaw disposed at a distal terminal end thereof, and the front elongate frame member comprises a clamp screw assembly; and a vise assembly coupled to the clamping assembly and comprising a left vise carriage and a right vise carriage, wherein:

the left and right vise carriages each comprise an elongate channel and a translation screw disposed therein, each translation screw comprises a front terminal end and a rear terminal end, a vise crank is coupled to the front terminal end of each translation screw, the left and right vise carriages each comprise at least one coupling receptacle structure partially disposed within their respective elongate channels, the at least one coupling receptacle structure of the left or right vise carriage is secured to a hub, the hub rotates independent of the at least one coupling receptacle structure of the left or right vise carriage, each of the at least one coupling receptacle structures secure either a first vise jaw or a second vise jaw to their respective vise carriages, each of the first and second vise jaws comprises a left terminal end and a right terminal end, each of the first and second vise jaws comprises a plurality of coupling apertures disposed therethrough, each coupling aperture is disposed at the left terminal end or at the right terminal end, at least one of the plurality of coupling apertures is an oblong coupling aperture, and the oblong coupling aperture is disposed over the left or right vise carriage that is not secured to the hub.

* * * * *